US012790094B2

(12) United States Patent
Goodrich

(10) Patent No.: US 12,790,094 B2
(45) Date of Patent: Nov. 10, 2026

(54) SYSTEMS AND METHODS FOR INCORPORATING LABELS AND THE LIKE WITH EXPANDABLE SLIT SHEET MATERIAL WRAP

(71) Applicant: David Paul Goodrich, Sedona, AZ (US)

(72) Inventor: David Paul Goodrich, Sedona, AZ (US)

( * ) Notice: Subject to any disclaimer, the term of this patent is extended or adjusted under 35 U.S.C. 154(b) by 10 days.

(21) Appl. No.: 18/226,761

(22) Filed: Jul. 26, 2023

(65) Prior Publication Data

US 2023/0365316 A1 Nov. 16, 2023

Related U.S. Application Data

(62) Division of application No. 17/506,093, filed on Oct. 20, 2021, now Pat. No. 11,745,930.

(60) Provisional application No. 63/094,022, filed on Oct. 20, 2020.

(51) Int. Cl.

| | |
|---|---|
| ***B65D 81/02*** | (2006.01) |
| ***B31D 1/00*** | (2017.01) |
| ***B65D 65/22*** | (2006.01) |
| ***B65D 65/40*** | (2006.01) |
| ***B65D 71/00*** | (2006.01) |
| ***B65D 81/03*** | (2006.01) |

(52) U.S. Cl.

CPC ........... *B65D 81/03* (2013.01); *B31D 1/0031* (2013.01); *B65D 65/22* (2013.01); *B65D 65/40* (2013.01); *B65D 71/0088* (2013.01)

(58) Field of Classification Search

CPC ........ B65D 81/03; B65D 81/05; B65D 77/02; B65D 65/22; B65D 65/40; B65D 65/44; B65D 2203/02; B65D 71/0088; B65D 27/005; B31D 5/0065; B31D 1/0031; B31D 2205/0023; B31D 5/006; B31D 3/04; B31D 5/0069

USPC ......... 206/521, 584; 428/136, 134; 383/118, 383/117

See application file for complete search history.

(56) References Cited

U.S. PATENT DOCUMENTS

| | | | | |
|---|---|---|---|---|
| 3,286,828 | A | 11/1966 | Yovanovich | |
| 5,688,578 | A * | 11/1997 | Goodrich | B65D 81/05 428/184 |
| 8,523,008 | B2 | 9/2013 | Kim et al. | |
| 8,727,296 | B1 | 5/2014 | Dyer | |
| 10,669,086 | B2 | 6/2020 | Goodrich | |

(Continued)

FOREIGN PATENT DOCUMENTS

WO 2018/191012 A1 10/2018

OTHER PUBLICATIONS

International Search Report issued in PCT/US2021/055770; dated Mar. 9, 2022. (Cited in parent U.S. Appl. No. 17/506,093).

(Continued)

*Primary Examiner* — King M Chu

(74) *Attorney, Agent, or Firm* — Studebaker Brackett PC

(57) ABSTRACT

According to some embodiments, systems and methods for applying labeling or indicia upon expandable slit sheet cushioning material is provided, including, in some examples, a) providing one or more unslit region within the expandable slit sheet material, b) providing one or more label or the like that is adhered or connected to a region of the expandable slit sheet material, and/or c) providing an over-layer sheet around the expandable slit sheet material.

11 Claims, 13 Drawing Sheets

(56) References Cited

U.S. PATENT DOCUMENTS

| | | | | |
|---|---|---|---|---|
| 2010/0162660 | A1 | 7/2010 | Jaconelli et al. | |
| 2010/0224637 | A1 | 9/2010 | Ikeda et al. | |
| 2011/0049224 | A1* | 3/2011 | Ashe | B65D 27/34 229/72 |
| 2012/0205272 | A1* | 8/2012 | Heilman | B65B 25/146 206/391 |
| 2017/0099958 | A1 | 4/2017 | Basset | |
| 2018/0370702 | A1 | 12/2018 | Goodrich | |
| 2019/0100369 | A1* | 4/2019 | Hoffman | B65D 65/406 |
| 2020/0024025 | A1 | 1/2020 | Takumah | |
| 2020/0270048 | A1 | 8/2020 | Goodrich | |

OTHER PUBLICATIONS

Written Opinion of the International Searching Authority issued in PCT/US2021/055770; dated Mar. 9, 2022. (Cited in parent U.S. Appl. No. 17/506,093).

* cited by examiner

Figure 6
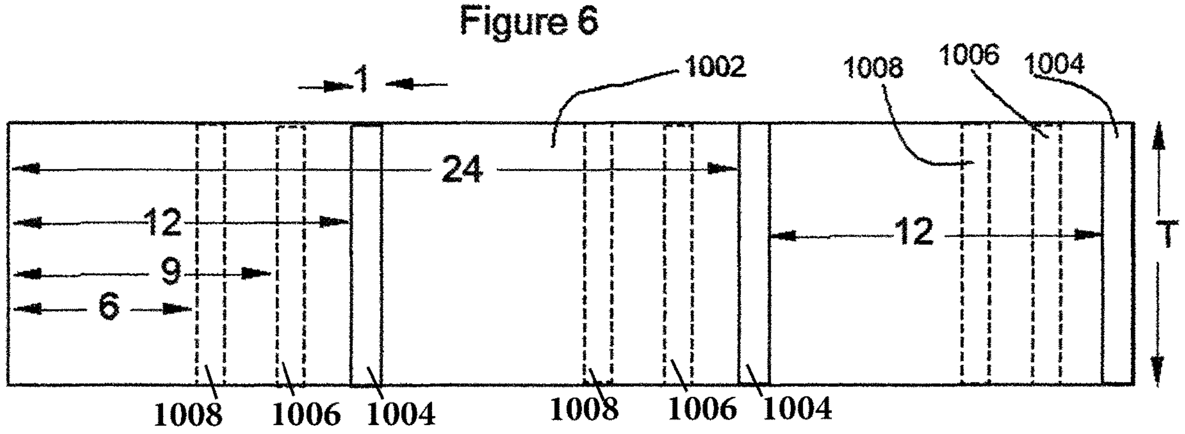
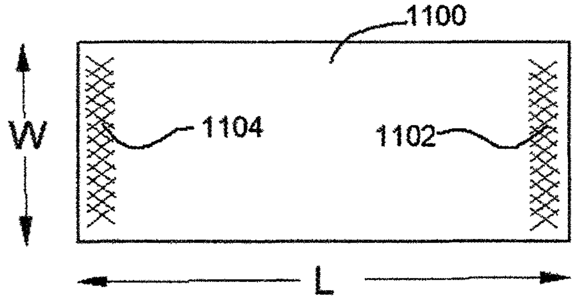
Figure 7
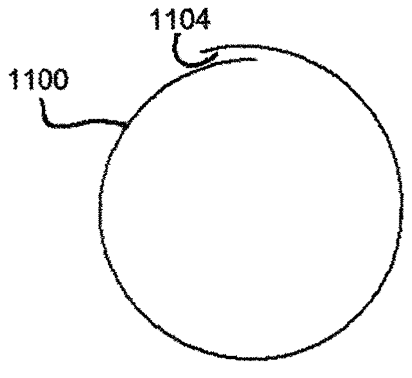
Figure 8A

SYSTEMS AND METHODS FOR INCORPORATING LABELS AND THE LIKE WITH EXPANDABLE SLIT SHEET MATERIAL WRAP

This application is a divisional of U.S. application Ser. No. 17/506,093, filed Oct. 20, 2021, which application is a non-provisional of and claims priority to U.S. provisional application Ser. No. 63/094,022, filed Oct. 20, 2020, entitled Slit Sheet Material Wrap with Adhesion Regions, the entire disclosures of which are incorporated herein by reference as though recited herein in full.

BACKGROUND

Field of the Invention

The preferred embodiments of the invention relate the use of slit sheet material for wrapping items, and some preferred embodiments relate to the incorporation of labels and the like with expandable slit sheet material.

Background Discussion

Expandable slit sheet packaging materials are well known in the package field. U.S. Pat. No. 10,669,086 (the '086 patent) describes a use of extensible paper to greatly reduce the tension required to stretch the slit sheet material. Advantageously, the wrap utilizes the extensible paper of the '086 patent in some preferred embodiments of the present invention. Among other things, the stretching with extensible paper provides greater resiliency while further facilitating the ease of stretching the slit sheet manually.

U.S. Pat. No. 5,688,578 ('578) illustrates in FIG. 11, the wrapping of expanded slit paper around a cylindrical object (see FIG. 1 of the present application). The '578 patent recites at column 12:

"The separator sheet 302 preferably has a width less than that of the expanded sheet 304 to allow for the cells to interlock when wrapped about an article as shown in FIG. 11. Thus, in the case of a twenty inch wide roll, the separator sheet should be in the range from about twelve to sixteen inches wide. The composite is wrapped around an article which is typically narrower than the expanded paper. The article is centered in the wrapped leaving expanded sheet material at the ends. The end regions of the expanded sheet will retract to a substantially less expanded state and interlock with adjacent, exposed layers of expanded sheet material. Where the article is wider than the paper, the wrapping starts with the article inwardly of one edge of the paper and the composite is wrapped with a spiral action progressing toward the other side, until composite overhangs both sides of the article. The final product is similar to that achieved where the article is narrower than the composite. By allowing for the cells to interlock, the use of tape or other means to secure the wrap around the article is eliminated.

SUMMARY

The preferred embodiments overcome shortcomings and/or other problems in the background art.

According to some preferred embodiments, systems and methods are provided to facilitate applying labeling or the like in the context of expandable slit sheet materials.

1. According to one exemplary embodiment, a structure having a cushioning comprising at least one layer of expandable slit paper for cushioning at least one object, said expandable slit paper having at least one transverse region that is unslit or unexpanded.

2. In some examples of 1 above, said expandable slit paper is expanded to form open cells for cushioning.
3. In some examples of 1 above, said object is a manually holdable product that is wrapped within a plurality of layers of the expandable slit paper.
4. In some examples of 1 above, said object is a pallet assembly.
5. In some examples of any of 1, 2, 3 or 4 above, an over-layer sheet is wrapped around the expandable slit paper.
6. In some examples of 5 above, said over-layer sheet is wrapped around the expandable slit paper, and wherein said expandable slit paper is wrapped around an item or object for cushioning of the item or object.
7. In some examples of 5 above, said over-layer sheet is wrapped around a section of said expandable slit sheet paper without surrounding an item or object that is cushioned by said expandable slit sheet paper.
8. In some examples of 5 above, said over-layer sheet is wrapped around at least the at least one layer of expandable slit paper and opposite ends of the over-layer sheet are connected together.
9. In some examples of 8 above, an adhesive is applied to at least one end region of the over-layer sheet such that the over-layer sheet bonds to itself.
10. In some examples of 1 above, said at least one transverse region is a plurality of unslit transverse regions at predetermined intervals.
11. In some examples of 10 above, the transverse regions are in a repeating pattern at predetermined intervals of greater than three inches.
12. In some examples of 11 above, the transverse regions are in a repeating pattern at predetermined intervals of greater than six inches.
13. In some examples of 11 above, the transverse regions are in a repeating pattern at predetermined intervals of greater than nine inches.
14. In some examples of 11 above, the transverse regions are in a repeating pattern at predetermined intervals of between 3 and 13 inches.
15. In some examples of 10 above, the transverse regions are in a repeating pattern at predetermined intervals of nine inches, plus or minus four inches.
16. In some examples of 10 above, the transverse regions are in a repeating pattern at predetermined intervals of six inches, plus or minus one inch.
17. In some examples of 1 above, a label is adhered or connected to the at least one transverse region that is unslit or unexpanded.
18. In some examples of 1 above, the slit sheet paper is a Kraft paper in the range from about 30# to 70#.
19. In some examples of 1 above, the expandable slit paper is an extensible paper having an extensibility in an expansion direction or machine direction of at least 5%.
20. In some examples of 1 or 19 above, the expandable slit paper is an extensible paper having an extensibility in a cross direction of at least 5%.
21. According to another exemplary embodiment, a structure is provided having a cushioning comprising a plurality of layers of expandable slit paper wrapped around the object, said expandable slit paper having at least one transverse region that is unslit or unexpanded.
22. In some examples of 21 above, said expandable slit paper is expanded to form hexagonal cells.

23. According to another exemplary embodiment, a structure is provided having a cushioning comprising at least one layer of expandable slit paper for cushioning at least one object, said expandable slit paper having at least one label adhered or connected to a region of the expandable slit paper in an unexpanded state prior to expansion of the expandable slit paper.
24. In some examples of 23 above, said expandable slit paper is expandable to form open cells for cushioning.
25. In some examples of 23 or 24 above, said expandable slit paper at the region adhered or connected to the at least one label is inhibited from expansion by the at least one label.
26. According to some embodiments, a method of making the structure of 23 above is performed that includes adhering or connecting the at least one label to the expandable slit sheet paper prior to expansion of the expandable slit sheet paper.
27. In some examples of 26 above, the method further includes forming the expandable slit sheet paper in an unexpanded state into a roll.
28. In some examples of 27 above, the method further includes connecting the at least one label to the expandable slit sheet paper after forming the expandable slit sheet paper into the roll.
29. In some examples of 28 above, the method further includes applying the at least one label to the expandable slit sheet paper prior to separation of the expandable slit sheet paper from the roll.
30. In some examples of 27 above, the method further includes applying the at least one label to the expandable slit sheet paper after separation of the expandable slit sheet paper from the roll.
31. In some examples of any of 26 to 30 above, the method further includes wrapping said expandable slit sheet paper around a pallet assembly.
32. In some examples of any of 26 to 30 above, the method further includes wrapping said expandable slit sheet paper around an item or object for cushioning of the item or object.
33. According to some further embodiments, a structure for applying labeling to an item or object wrapped in an expandable slit sheet paper for cushioning is provided that includes: at least one layer of expandable slit sheet paper wrapped around an item or object for cushioning; an over-layer sheet wrapped around the expandable slit paper; and indicia or labeling applied to the over-layer sheet.
34. In some examples of 33 above, the over-layer sheet is wrapped around the expandable slit paper, and said expandable slit paper is wrapped around an item or object for cushioning of the item or object.
35. In some examples of 33 above, said over-layer sheet is wrapped around a section of said expandable slit sheet paper without surrounding an item or object that is cushioned by said expandable slit sheet paper.
36. In some examples of 35 above, said expandable slit sheet paper is wrapped around a pallet assembly.
4. In some examples of any of 33 to 36 above, opposite ends of the over-layer sheet are connected together.
38. In some examples of 37 above, the structure further includes an adhesive applied to at least one end region of the over-layer sheet such that the over-layer sheet bonds to itself.
39. In some examples of any of 33 to 38 above, said over-layer sheet has a width in an expansion direction of the expandable slit sheet paper of between about 1 to 12 inches.
40. In some examples of any of 33 to 38 above, said over-layer sheet has a width in an expansion direction of the expandable slit sheet paper of between about 4 to 9 inches.
41. In some examples of any of 33 to 38 above, said over-layer sheet has a width in an expansion direction of the expandable slit sheet paper of between about 8 to 9 inches.
42. In some examples of any of the above structures or methods of 1-41 above, the slit sheet paper is a Kraft paper in the range from about 30# to 70#.
43. In some examples of any of the above structures or methods of 1-41 above, the expandable slit paper is an extensible paper having an extensibility in a machine direction of at least 5%.
44. In some examples of any of the above structures or methods of 1-41 above, the expandable slit paper is an extensible paper having an extensibility in a cross direction of at least 5%.

According to some other preferred embodiments, a plurality of layers of expandable slit paper are expanded and wrapped around an object. In some embodiments, said expandable slit paper forms hexagonal cells.

In some embodiments, at least one transverse region of the expandable slit paper is unslit or unexpanded.

In some embodiments, the unslit regions are formed with a rotary slitting tool that has repeatable non-cutting transverse regions to produce a slit paper sheet having repeating uncut areas.

In some embodiments, an over-layer sheet is wrapped around the outer layer of expanded wrap that is wrapped around an object. The over-layer has an adhesive applied to at least one end region such that the over-layer when wrapped around the outer layer of expanded wrap, it will bond to itself. In some embodiments, an adhesive is applied to each end of the over-layer sheet in the region of the underside of the sheet thereby binding the over-layer sheet together with the outer layer of expanded wrap that is wrapped around an object.

In some embodiments, a plurality of transverse regions of the expandable slit paper is unslit or unexpanded. The plurality of transverse regions can be in a repeating pattern at predetermined intervals.

In some embodiments, a plurality of transverse regions of the expandable slit paper is unslit or unexpanded. The plurality of transverse regions can be in a repeating pattern at predetermined intervals of nine inches, plus or minus four inches.

In some embodiments, pluralities of transverse regions of the expandable slit paper are unslit or unexpanded. In some embodiments, the plurality of transverse regions can be in a repeating pattern of intervals. In some illustrative and non-limiting examples, the plurality of transverse regions can be in a repeating pattern of intervals of of six inches, plus or minus one inch.

In some embodiments, pluralities of transverse regions of the expandable slit paper are unslit or unexpanded. In some other illustrative and non-limiting examples, the plurality of transverse regions can be in a repeating pattern at predetermined intervals of nine inches, plus or minus one inch.

In some embodiments, pluralities of transverse regions of the expandable slit paper are unslit or unexpanded. In some other illustrative and non-limiting examples, the plurality of transverse regions can be in a repeating pattern at predetermined intervals of twelve inches, plus or minus one inch.

In some embodiments, pluralities of transverse regions of the expandable slit paper are unslit or unexpanded. In some other illustrative and non-limiting examples, the plurality of transverse regions can be in a repeating pattern at predetermined intervals of at least nine inches.

In some embodiments, pluralities of transverse regions of the expandable slit paper are unslit or unexpanded. In some other illustrative and non-limiting examples, the plurality of transverse regions can be in a repeating pattern at predetermined intervals of at least six inches. Advantageously, in some preferred embodiments, a label is adhesively adhered to one or more or in some embodiments two or more unslit or unexpanded transverse regions. In some other embodiments, a label can be otherwise attached a respective unslit region, such as, e.g., by mechanical connection, such as, e.g., stitching, staples or the like, other other bonding. In some other embodiments, a label can be printed or otherwise applied to a respective unslit region.

In some embodiments, pluralities of transverse regions of the expandable slit paper are unslit. In some other illustrative and non-limiting examples, the plurality of transverse regions can be in a repeating pattern at predetermined intervals of at least six inches.

In some embodiments, pluralities of transverse regions of the expandable slit paper are unslit and are in a repeating pattern at predetermined intervals of at least six inches. Advantageously, in some preferred embodiments, a label is adhesively adhered to one or more or in some embodiments two or more unslit transverse regions. In some other embodiments, a label can be otherwise attached a respective unslit region, such as, e.g., by mechanical connection, such as, e.g., stitching, staples or the like, other other bonding. In some other embodiments, a label can be printed or otherwise applied to a respective unslit region.

In some embodiments, an over-layer sheet is wrapped around the outer layer of expanded wrap that is wrapped around an object. In some embodiments, the over-layer has an adhesive applied to at least one end region such that the over-layer when wrapped around the outer layer of expanded wrap, it will bond to itself. In some embodiments, an adhesive is applied to each end of the over-layer sheet in the region of the underside of the sheet thereby binding the over-layer sheet together with the outer layer of expanded wrap that is wrapped around an object.

In some embodiments, an over-layer sheet is wrapped around the outer layer of expanded wrap that is wrapped around an object. In some embodiments, the over-layer has a length greater than the circumference of the outer layer of expanded wrap, whereby the over-layer overlaps itself. In some embodiments, the over-layer has an adhesive applied to at least one end region such that the over-layer when wrapped around the outer layer of expanded wrap, it will bond to itself in the overlap region. In some embodiments, an adhesive is applied to each end of the over-layer sheet in the region of the underside of the sheet thereby binding the over-layer sheet together with the outer layer of expanded wrap that is wrapped around an object.

In some embodiments, an over-layer sheet is wrapped around the outer layer of expanded wrap that is wrapped around an object. In some embodiments, the over-layer sheet has a length greater than the circumference of the outer layer of expanded wrap, whereby the over-layer overlaps itself and is adhesively bonded to itself in the overlap region. In some embodiments, an adhesive is applied to at least one side of the over-layer sheet in an end region of the sheet thereby binding the over-layer to itself. Advantageously, in some examples, the adhesive is applied to the side of the over-layer sheet that comes into contact with the outer layer of expanded wrap. In some preferred embodiments, the adhesive is applied to opposing end regions and the end regions are on the side of the over-layer sheet that comes into contact with the outer layer of expanded wrap.

In some embodiments, the slit sheet paper is a Kraft paper in the range from about 40# to 60#. In some embodiments, the slit sheet paper is a Kraft paper in the range from about 30# to 70#.

In some embodiments, the slit sheet paper has a slit pattern in the range from of approximately 0.45" slit length, 0.17" land length between ends of slits, and 0.11" row width between slits to approximately 0.40" slit length, 1.15" land length between ends of slits, and 0.1125" row width between slits.

In some embodiments, the slit sheet paper has a slit pattern with slits each having a length of 0.45" or less. In some embodiments, the slit sheet paper has a slit pattern with slits each having a length of 0.40" or less.

In some embodiments, the expandable slit paper is an extensible paper having an extensibility in a machine direction of at least 5%. In some embodiments, the expandable slit paper is an extensible paper having an extensibility in a cross direction of at least 5%.

According to some other embodiments, a method of applying of a plurality of layers of expandable slit paper around an item is provided, said paper expanding in thickness when stretched to form expanded cells, includes: having the user manually grasp an end region of a roll of unexpanded slit sheet paper and pull the end region in a direction away from said roll of unexpanded slit sheet paper so as to cause said sheet to expand to form a plurality of expanded cells; having the user wrap the expanded sheet around an item.

In some embodiments, the method further includes: the roll of unexpanded slit sheet paper having pluralities of unslit transverse regions of the expandable slit paper in a repeating pattern at predetermined intervals of at least six inches; having the user wrap the expanded sheet around the item and tear the expanded sheet from the roll of slit paper; adhesively adhering a label member to at least one, or in some embodiments two or more, unslit transverse regions; whereby the expanded sheet is maintained in an expanded state subsequent to the wrapping of the expanded sheet around the item. In some preferred embodiments, the label member includes a bar code label adhered to an unslit transverse region. In some preferred embodiments, the label member extends across a transverse end of the expanded slit sheet and, in some preferred embodiments, is further adhered to another unslit transverse region.

For the purposes of some of the preferred embodiments of the present invention, slit sheet paper employed can include, e.g., the paper and slit patterns described in U.S. Pat. No. 5,667,871, the entire disclosure of which is incorporated herein by reference.

Further information relating to exemplary slit sheet paper that can be used in various embodiments of the present invention, various slit patterns of such papers, and the expansion process by which the slit sheet paper is expanded is found in the following patents and applications, the entire disclosures of which are all incorporated herein by reference: U.S. Pat. Nos. 5,538,778; 5,667,871; 5,688,578; 5,782,735; 3,908,071; 10,669,086; U.S. patent application Ser. No. 14/901,977; PCT Application No. WO1984002936A1; U.S. Patent Application Pub. No. 2002/

0060034; U.S. Patent Application Pub. No. 2007/0240841; U.S. Pat. Nos. 3,104,197; 3,220,116; 3,266,972; 3,269,393; 3,908,071; 6,024,832; 6,458,447; 6,712,930 B2. As indicated, the entire disclosures of each of the foregoing patents, publications and applications are all incorporated by reference herein, as though recited in full.

For reference, FIG. 1 corresponds to FIG. 11 of U.S. Pat. No. 5,688,578 (the ('578 patent). The figure describes existing "slit sheet" expandable paper structure wrapped around a cylindrical object, such as a bottle.

In the preferred embodiments, the term "slit sheet" paper means an expandable paper sheet having a slit pattern. In the preferred embodiments of the present invention, the terminology "slit sheet" paper is intended to be broad enough to be inclusive of a slit sheet paper that includes a plurality of transverse regions of the expandable slit paper that are unslit. In some embodiments, the transverse regions advantageously are in a repeating pattern at predetermined intervals.

The following are direct quotes of U.S. Pat. No. 5,667,871 (the '871 patent). First, column 10, lines 13-48, of the '871 patent explains:

"The length of the slit and the ratio of the land intervals between slit affects the dimensions of the polygons which are formed during the expansion step. The higher the ratio of slit length to interval length the greater is the maximum angle which can be formed between the plane of the sheet and the planes of the land areas. The greater the uniformity of the shape and size of the formed polygonal shaped open areas and the angle to which the land areas incline relative to the flat sheet, the greater is the degree to which interlocking of land areas can be achieved. Interlocking of land areas, that is, the nesting of layers of sheets, reduces the effective thickness of the sheets. However, the net effect is still a dramatic increase in effective sheet thickness. For example, 0.008 inch thick paper having a silt pattern of a ½" slit, 3/16" slit spacing, and ⅛" row spacing, produces a ¼" by 3/16" land which can expand to under about one quarter of an inch thickness and will have a net effective thickness for two layers, when nested, of about 0.375 inches. It is noted that the land width is double the width of the legs. The net effect is a useful thickness expansion of roughly 20 times the unexpanded thickness of the paper."

"The longer the slit relative to the rigidity of the sheet material, the weaker is the interlocking effect and the cushioning effect due to the weakness of the expanded structure. If the slits are too small, expansion can be severely limited and cushioning can be excessively limited. This does not mean that the dimensions are narrowly critical, but rather that the dimension must be selected relative to the characteristics of the paper, as for example the degree of rigidity, and the cushioning or energy absorbing effects which are required. The resistance to expansion increases relative to the increase in the size of the land areas. It should be understood that some resistance to opening is desired. The object rests on, or contacts the edge of the sheet formed by the incline of the land areas which turns the perimeter of the openings into upper and lower edges."

Second, column 10, lines 58-67 and column 11, lines 1-6, of the '871 patent further explains:

"As heretofore mentioned, the slit dimensions can be varied to ease the process of opening. A ⅝" slit, 3/16" land by 3/16 row opens very easily since the number of hexagons is reduced. When the size of the hexagons are increased and the numbers decreased; the stretched thickness was increased, producing a very viable wrap material. This sizing increases the yield of the paper and provides almost the same protection as the ½" slit. This sizing provides a less expensive product utilizing a larger content of post consumer waste while maintaining the integrity of the wrap product. The ½" slit, 3/16" land by ⅛" row pattern produces a more protective wrap due to the greater number of wraps that can be made within the same volume. Thus, a 2⅝ pound vase dropped from a thirty inch height, with only ½" of cumulative sheet thickness around the vase, can be protected with the ½" slit, ¼ by 3/16 inch land pattern."

In some illustrative embodiments, embodiments of the present invention can be manufactured in accordance with the disclosures of the following patents, publications and applications, the entire disclosures of which are all incorporated herein by reference: U.S. Pat. No. 7,175,731; U.S. Patent Application Pub. No. 2007/0204572; Canadian Patent No. CA1312889C; U.S. Pat. No. 5,299,833; PCT Application No. WO1998057810; U.S. Pat. Nos. 3,778,324; 3,937,491; U.S. Pat. No. 848,680; U.S. Pat. Nos. 4,149,288; 8,702,085; U.S. Pat. No. 741,878; U.S. Pat. Nos. 2,367,608; and 5,112,083 (see, e.g., FIG. 6). As indicated, the entire disclosures of the foregoing patents, publications and applications are all incorporated by reference herein, as though recited in full.

In some embodiments, a rotary slitter of the prior art can be modified to have a transverse region that does not have slitter blades. Depending upon the diameter of the rotary slitter and the space between unslit regions, the rotary slitter can have one or a plurality of transverse regions that does not have slitter blades.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features, and/or advantages of particular embodiments should not be construed as limiting other embodiments or the claims.

BRIEF DESCRIPTION OF DRAWINGS

The preferred embodiments of the present invention are shown by a way of example, and not limitation, in the accompanying figures, in which:

FIG. 4 is a perspective view of a roll of slit sheet material having unslit regions for adhesively or otherwise receiving a label or the like;

FIG. 5 is a plan view of a slit sheet material having unslit regions for adhesively or otherwise receiving a label or the like;

FIG. 6 is a plan view of a slit sheet material having unslit regions for adhesively or otherwise receiving a label or the like;

FIG. 7 is a plan view of an over-layer unslit sheet material having plurality of end regions for adhesively bonding or otherwise connecting to itself; and FIG. 8A is an end view of an over-layer unslit sheet material having plurality of end regions for adhesively bonding or otherwise connecting to itself that can be employed in some embodiments of the present invention;

FIG. 17 shows another embodiment in which an over-layer of unslit sheet material is wrapped around a region of expandable slit sheet material extending from a roll of slit sheet material, such as, e.g., in the context of a roll of slit sheet material similar to that shown in the pallet wrapping system of FIG. 9 or the like;

DISCUSSION OF THE PREFERRED EMBODIMENTS

Figure 1:
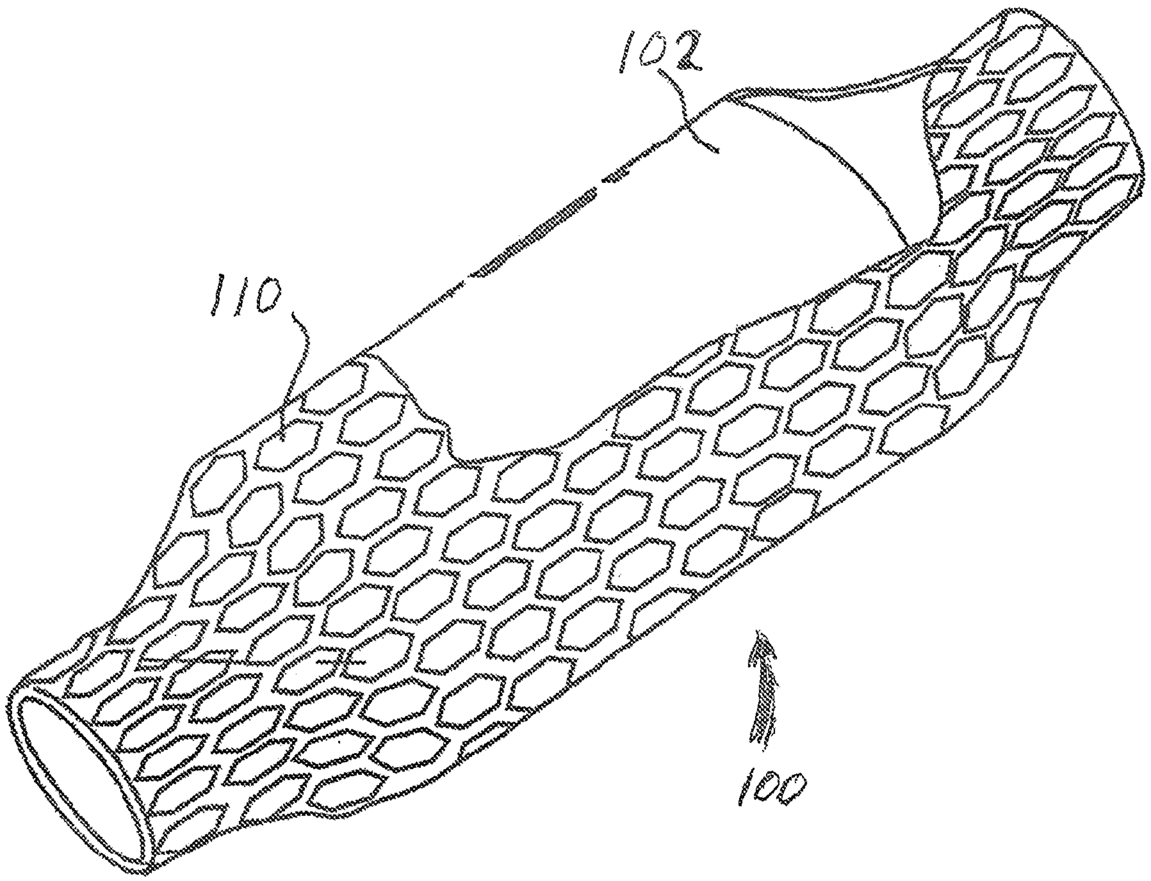
Figure 1 Prior Art
FIG. 1 is a perspective view of a bottle, or the like, wrapped with expanded slit sheet material, in accordance with the prior art.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

DESCRIPTION OF PREFERRED EMBODIMENTS OF THE INVENTION

U.S. Pat. No. 10,669,086 (the '086 patent) describes a use of extensible paper to greatly reduce the tension required to stretch the slit sheet material. Advantageously, in some preferred embodiments, an extensible paper as described in the '086 patent is employed in some preferred embodiments of the present invention. Among other things, the stretching with extensible paper provides greater resiliency while further facilitating the ease of stretching the slit sheet manually.

In accordance with one broad embodiment of the invention, an expanded slit sheet paper is made with an extensible paper that, e.g., advantageously substantially reduces a pulling force necessary to expand the expanded slit sheet material. Among other benefits, this reduced pulling force leads to a variety of very substantial benefits, including that it avoids previously required complex resistant devices that were previously necessary and opens the market to smaller manual expansion devices that can be made to be completely or almost completely recyclable.

Products, such as, for example, bottles or other cylindrical items, as well as various other items, are wrapped with expanded slit sheet paper and are put in storage awaiting orders for the items. In accordance with some embodiments of the present invention, a label (such as, e.g., having product information, indicia, logos, barcodes and/or other information) is applied to the wrapped item by adhering or applying the label to unslit regions of the expanded slit sheet material.

In some embodiments, an over-layer sheet is wrapped around an outer layer of expanded wrap that is wrapped around an object. In some embodiments, the over-layer has a length greater than the circumference or perimeter of the outer layer of expanded wrap, whereby the over-layer overlaps itself. In some embodiments, the over-layer has an adhesive applied to at least one end region such that the over-layer when wrapped around the outer layer of expanded wrap, it will bond to itself in the overlap region.

In some embodiments, an adhesive is applied to each end of the over-layer sheet in the region of the underside of the sheet thereby binding the over-layer sheet together with the outer layer of expanded wrap that is wrapped around an object. In the preferred embodiments, the over-layer sheet has a length sufficient to completely circumscribe the wrapped item.

In some embodiments, an over-layer sheet is wrapped around a region of at least one layer of expanded slit sheet material. In some embodiments, the at least one layer of expanded slit sheet material is a plurality of layers of expanded slit sheet material. In some embodiments, the at least one layer of expanded slit sheet material is a plurality of layers of expanded slit sheet material wrapped around an item or object. In some embodiments, the at least one layer of expanded slit sheet material includes at least one layer of expanded slit sheet material having the over-layer wrapped around the at least one layer of expanded slit sheet material without surrounding an item wrapped by the at least one layer of expanded slit sheet material.

According to some embodiments, the slit sheet paper is made with an extensible paper. According to some embodiments, the extensible paper is extensible in a machine direction in a range of at least 5%. According to some embodiments, the extensible paper is extensible in a cross direction in a range of at least 5%. According to some embodiments, the extensible paper is extensible in a machine direction in a range of at least 5% and in a cross direction in a range of at least 5%. According to some embodiments, the extensible paper is extensible in a machine direction in a range of at least 6% and in a cross direction in a range of at least 6%. According to some embodiments, the extensible paper is extensible in a machine direction in a range of at least 7% and in a cross direction in a range of at least 7%. According to some, most preferred, embodiments, the extensible paper is extensible in a machine direction in a range of at least 8% and in a cross direction in a range of at least 8%. According to some embodiments, the extensible paper is extensible in a machine direction in a range of between 5% to 15% and in a cross direction in a range of between 5% to 15%. According to some embodiments, the extensible paper is extensible in a machine direction in a range from 7% to 15% and in a cross direction in a range from 7% to 15%. According to some embodiments, the extensible paper is extensible in a machine direction in a range between 3 to 20%. According to some embodiments, the extensible paper is extensible in a cross direction in a range between 3 to 20%. It should be appreciated that the extensibility of the paper corresponds to the extensibility of the paper in an unslit state—i.e., corresponds to the extensible nature of the material of the paper itself.

In some exemplary and non-limiting embodiments, a preferred reduced slit pattern utilizing 50# Kraft paper with a slit pattern of approximately 0.45" slit, 0.17" land, 0.11" row width yields about 2.72-2.92 pounds of per inch of crush strength which, can yield a 27% increase in strength with a 10% decrease in thickness from approximately 0.187" to 0.169". Another exemplary and non-limiting preferred slit pattern is approximately 0.40" slit, 1.15" land, 0.1125" row width, yielding 3.1-3.3 pounds per inch crush strength which produces a 40% increase in crush strength from 0.1875" to 0.169." Although for clarity dimensions may be provided to four decimal places, in some other embodiments, the dimensions can vary +/−15% and, preferably, +/−10%.

It has now been found that the shorter paper fibers make them stiffer and therefore increases their strength which, can be extrapolated by the ratio in the thicknesses of the sheet from 0.1875 to 0.16875 which, in this case is a 10% increase in strength if all things were equal but, they are not. The additional increase in strength is also due to the decrease, which is preferably about 10% in cell size as compared to the prior art slit pattern. This provides more cells per square foot and accordingly a greater crush resistance. Increased crush resistance generally correlates directly with increased cushioning. Increased crush resistance is good for cushioning some things and not for others. For the most part, the items placed in an envelope require less crush distance to absorb shock. Something extreme fragile might require 2" of distance to absorb shock to be safe.

With respect to the background art shown in FIG. 1, the wrapped bottle 100 includes a bottle 102 that is wrapped with the slit sheet material expanded to form hexagonal cells 110.

Figure 2:
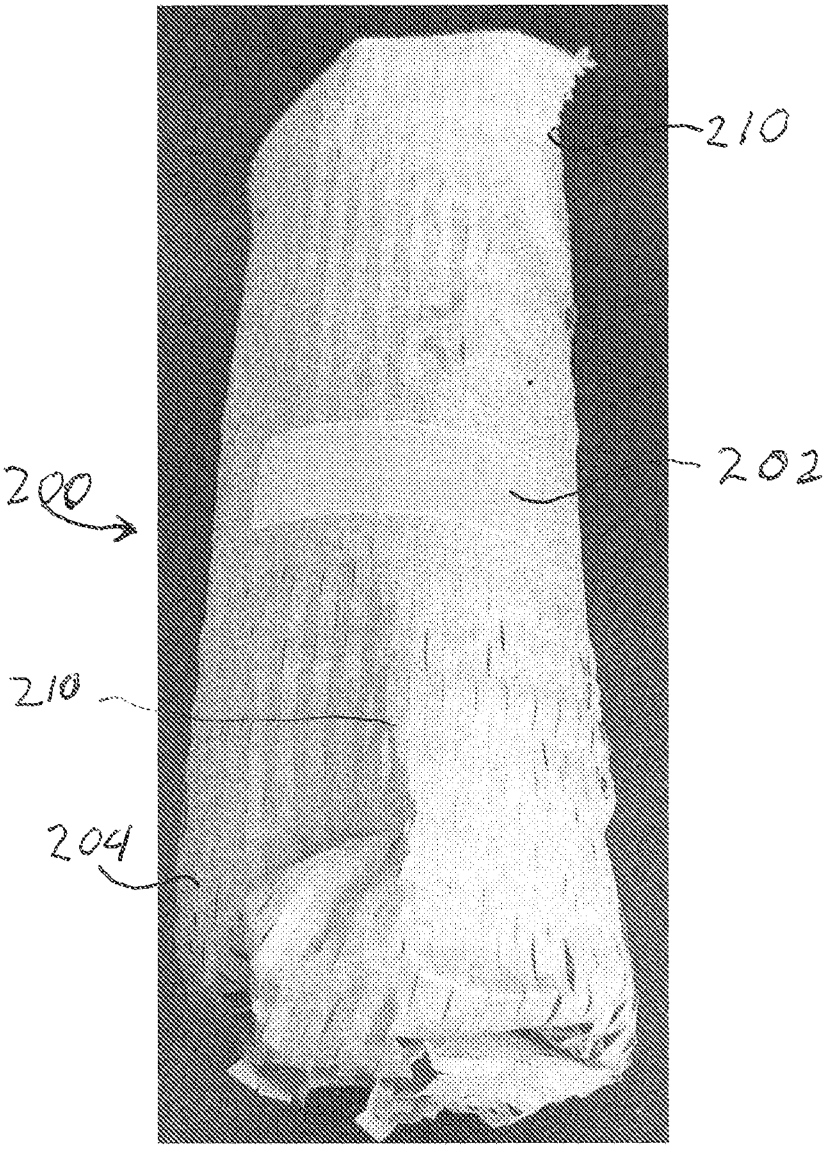
FIG. 2 is a perspective image of a bottle, or the like, wrapped with expanded slit sheet material and having a label adhered to an unexpanded region of the otherwise expanded slit sheet material.

In the illustrative embodiment shown in FIG. 2, an item 200 is wrapped with expanded slit sheet material 204 and having a label, strip of material or the like 202 adhered to an unexpanded region of the otherwise expanded slit sheet material. In this embodiment, the label is applied to an unexpanded region of the expandable slit sheet material. In some preferred implementations, as shown in FIG. 2, the label 202 overlies the front edge 210 of the slit paper, thus preventing the wrapped slit material from unwinding or unraveling.

In some embodiments, advantageously, a biodegradable/compostable rubber band can be placed around the slit paper wrap to prevent the wrap from uncurling prior to the label or strip of material 202 being adhered to the wrap 204. The rubber band can subsequently be removed and reused or left of the wrapped item 200. While rubber is preferred because it is biodegradable, in some other embodiments, other elastic materials can be used. However, most preferably the elastic material is biodegradable.

Figure 3:
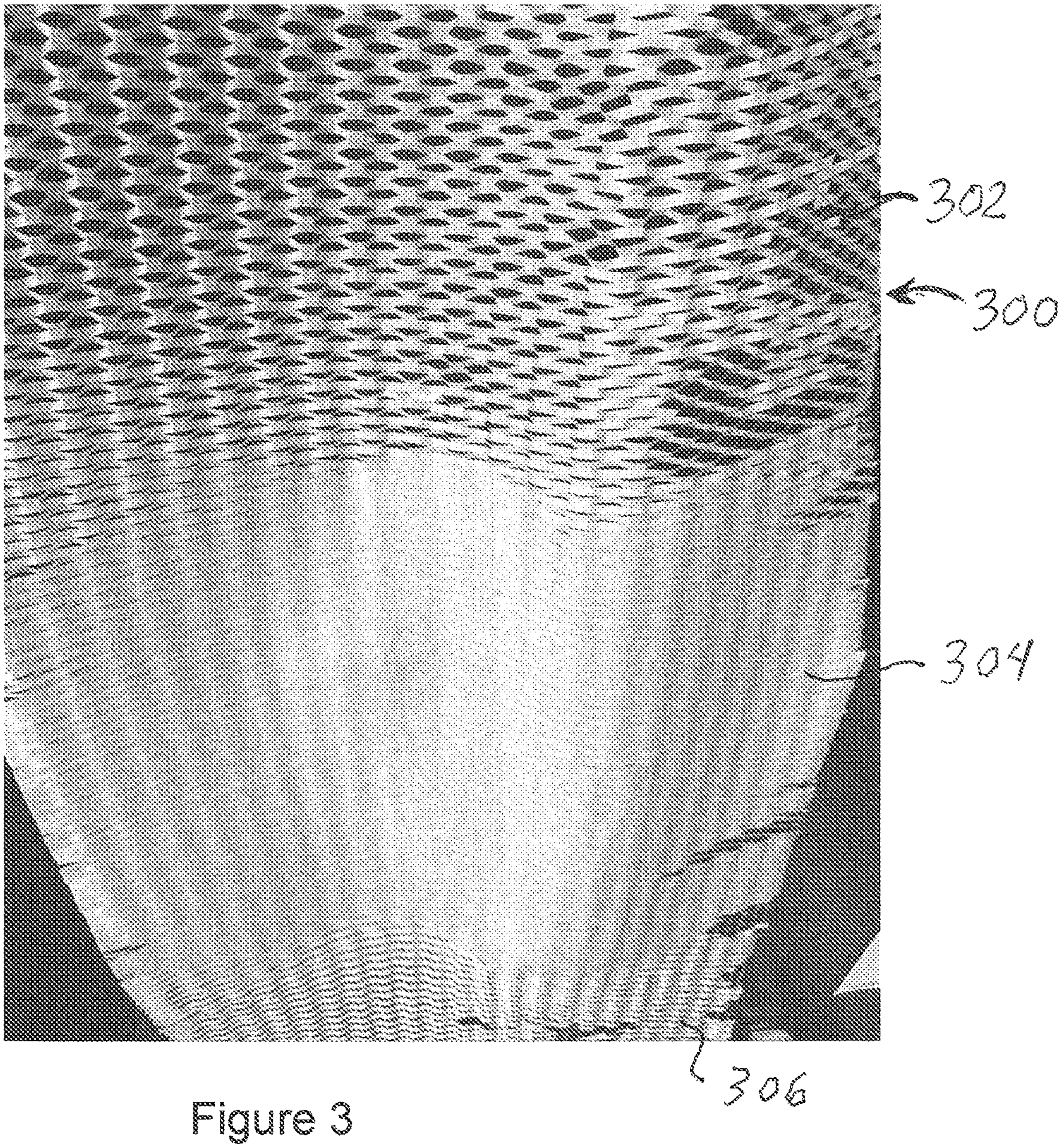
FIG. 3 is a perspective image of an expanded slit sheet material having unexpanded region of the otherwise expanded slit sheet material.

In some embodiments, a label or strip of material or the like is adhered to a region of a sheet of slit sheet material having slits, but prior to expansion of such slits. By way of illustration, FIG. 3 shows an expanded slit sheet material 300 having an unexpanded region 304 and expanded regions 302 and 306. In some embodiments, a label or strip of material or the like is adhered to an unexpanded region (similar to that shown at 304) such that the unexpanded region is prevented from expanding adjacent the label or strip of material and the unexpanded region of expandable slit sheet material rests flush or flat against the label or strip of material.

Figure 4:
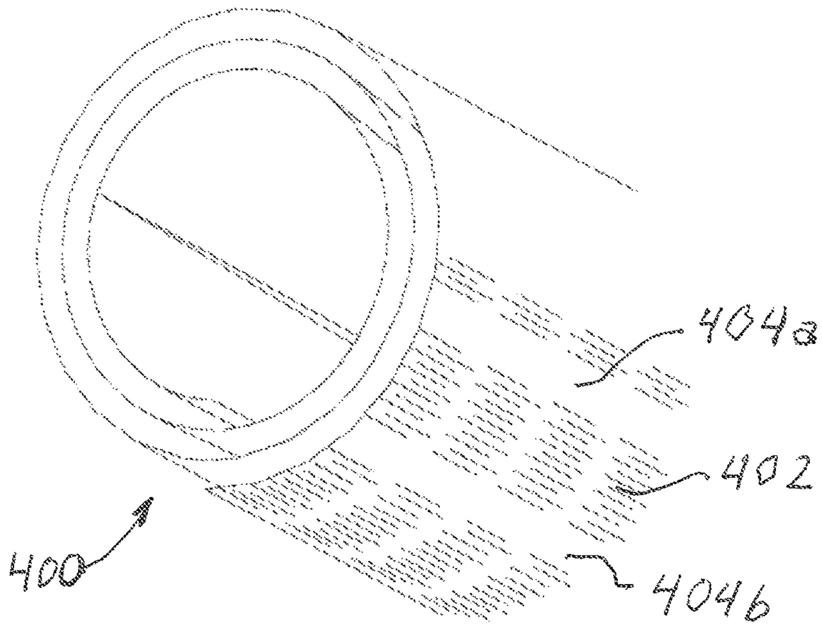

FIG. 4 shows a second preferred embodiment in which an expandable slit sheet material includes one or more regions without slits for adhering or otherwise applying a label or the like. In the example shown in FIG. 4, a roll of slit sheet material indicated generally as 400 has slits 402. In the preferred embodiment, as shown, the slit sheet material also has at least one, preferably, a plurality of, unslit regions 404*a* and 404*b* for adhesively or otherwise receiving a label or the like. In some preferred embodiments, the unslit regions 404*a* and 404*b* extend entirely or substantially entirely across a width of the slit sheet material (i.e., a width in a direction transverse to the expansion direction of the expandable slit sheet paper). In some preferred embodiments, the unslit regions 404*a* and 404*b* are located at preset intervals in the expansion direction of the expandable slit sheet material, which interval length can be selected as desired based on the use (such as, e.g., the sizes of items to be wrapped with the expandable slit sheet material).

Figure 5:
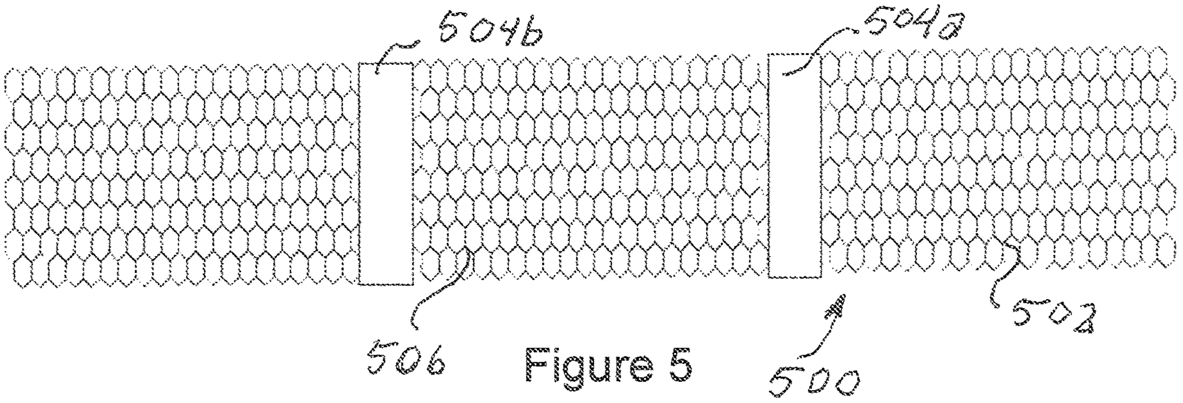

FIG. 5 is a top or plan view of an expandable slit sheet material similar to that shown in FIG. 4 in an expanded state. Towards that end, FIG. 5 shows a slit sheet material indicated generally as 500, having expanded slit regions 502 and 506 having unslit regions 504*a*, 504*b* for adhesively or otherwise receiving a label, strip of material, or the like. In the preferred embodiments, the unslit regions are at predetermined intervals between slit regions, and present an adhesion or connecting surface when the slit sheet material is expanded such as to create expanded regions, such as indicated at 502 and 506.

FIG. 6 is a top or plan view of another slit sheet material similar to that shown in FIG. 5 having unslit regions for adhesively or otherwise receiving a label or the like. FIG. 6 shows the slit sheet material in a plan view for illustrative purposes. In the preferred embodiments, unslit regions, such as 1004, 1006, and/or 1008, are positioned at predetermined intervals between slit regions 1002. In the illustrated example, the unslit region 1004 is shown as being positioned at 12 inch intervals. In some embodiments, alternatively, the unslit regions can be spaced at 9 inch intervals as shown with respect to unslit regions 1006. In some embodiments, as another alternative, unslit regions 1008 can be spaced at 6 inch intervals. In various embodiments, the intervals between unslit regions can be set as desired based on use. In some examples, the distance between intervals can be between about 2-3 inches to 2-3 feet or larger. For example, in some embodiments, the distance between intervals can be about 10 feet or larger, such as, e.g., when the slit sheet paper is wrapped around very large objects, such as, e.g., large boxes, pallets or the like.

In various embodiments, the unslit regions can have widths (i.e., in the expansion direction or lengthwise direction of the slit sheet paper) as desired. In some illustrative embodiments, the unslit regions can have a width of from about 0.5 inches to at least 1 inch. In some illustrative embodiments, the unslit regions have a width of at least 1.5 inches. In some illustrative embodiments, the unslit regions can have a width of 4 or more inches, and even, e.g., 8-12 inches in some embodiments, such as, e.g., in embodiments in which the expandable slit sheet paper is wrapped around larger objects, such as, e.g., large boxes, pallets or the like.

In some alternative embodiments, labeling or the like can be applied upon expandable slit sheet paper by providing a separate over-layer sheet of unslit material external to the expandable slit sheet paper and/or surrounding the expandable slit sheet paper. By way of example, FIG. 7 shows an alternative to the embodiments of FIGS. 2-6 that includes an over-layer unslit sheet material 1100 having plurality of end regions, such as 1102 and 1104 for adhesively bonding or otherwise connecting the sheet 1100 to itself. In some preferred embodiments, the over-layer sheet 1100 is wrapped around the outer layer of expanded wrap that is wrapped around an object. For example, an expandable slit sheet material that is wrapped around an object similar to that shown in FIG. 1 can be further wrapped with the over-layer sheet 1100 shown in FIG. 7. In the preferred embodiment, the over-layer sheet has a length greater than the circumference of the outer layer of expanded wrap that surrounds the wrapped object, whereby the over-layer overlaps itself and is adhesively bonded or otherwise connected to itself in the overlap region. The length L of the sheet 1100 can have any desired length that is substantially longer than the circumference of the outer layer of expanded wrap. In some illustrative embodiments, the length L of the sheet 1100 preferably has a length that is at least one inch longer than the circumference of the outer layer of expanded wrap, and, more preferably, has a length L that is at least 2 inches longer than the circumference of the outer layer of expanded wrap.

In some embodiments, an adhesive is applied to at least one side of the over-layer sheet in an end region of the sheet thereby enabling the over-lay sheet 1100 to be adhered to itself. In some embodiments, the adhesive is also advantageously applied to a side of the over-layer sheet that comes into contact with the outer layer of expanded wrap (e.g., to fixedly locate the over-layer sheet around the expanded wrap). In some embodiments, adhesive can be applied to opposing end regions that are on the side of the over-layer sheet that comes into contact with the outer layer of expanded wrap. As previously noted, in some embodiments, a biodegradable/compostable rubber band can be placed around the slit paper wrap to prevent the wrap from uncurling prior to the overlay sheet 1100 being wrapped around the wrapped item and being adhered to itself. In some examples, such a rubber band can subsequently be removed and reused or left of the wrapped item 200. While rubber is preferred because it is biodegradable, other elastic materials can be used and, most preferably, such elastic material is biodegradable.

In some implementations of the embodiment shown in FIG. 7, the over-layer sheet is sized so as to surround an entire periphery of an expanded slit sheet material wrapped around an object or so as to surround a small or limited portion of a periphery of an expanded slit sheet material wrapped around an object.

For example, in some embodiments, the width W of the unslit sheet of a material 1100, preferably paper, is preferably less that the transverse dimension T of the slit paper sheet that is wrapped around the object or item (see, e.g., dimension T of sheet shown in FIG. 6). In some embodiments, the width W can be determined based on the dimensions of a label that will be adhered or otherwise connected to the unslit sheet 1100 and is, preferably, at least one inch wider than the corresponding dimension of such a label. For example, in some embodiments, the label is a shipping label. In some embodiments, shipping labels can be of any required size—such as, for example, 3.5"×5", 6.75"×4.5", and 7"×5". Accordingly, in some illustrative embodiments, the sheet 1100 can be greater than 4 inches wide, and can be at least 6 inches wide, or wider to accommodate a common shipping label in some embodiments.

As shown in the embodiment of FIG. 8A, in some embodiments, the over-layer unslit sheet material 1100 has adhesive 1104 positioned at least at the undersurface of its overlapping region for adhesively bonding to an underlying region of the sheet 1100. Although an adhesive is employed in some preferred embodiments to bond or connect the over-layer unslit sheet to itself around the wrapped item, in some alternative embodiments other connections can be employed, such as, e.g., mechanical connections such as, e.g., staples, stitches, clips or the like, and/or other forms of bonding or adhesion.

Accordingly, in the preferred embodiments, the over-lay sheet 1100 overlaps and is connected such as to bind to itself, such as to, e.g., surround or encircle a periphery of the wrapped item.

Figure 8B:
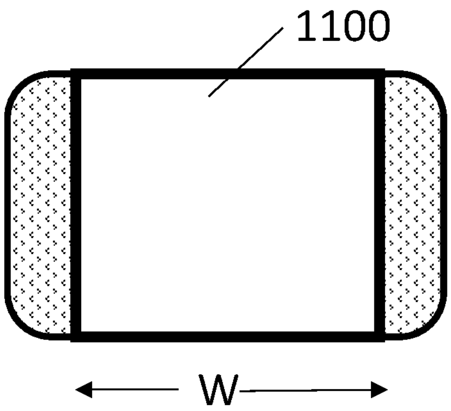
FIG. 8B is a side view of an over-layer unslit sheet material wrapped around an object wrapped in expanded slit sheet material in which the width of the over-layer unslit sheet material is sized to substantially extend across or surround a substantial portion of a periphery of the object wrapped in expanded slit sheet material.
Figure 8C:
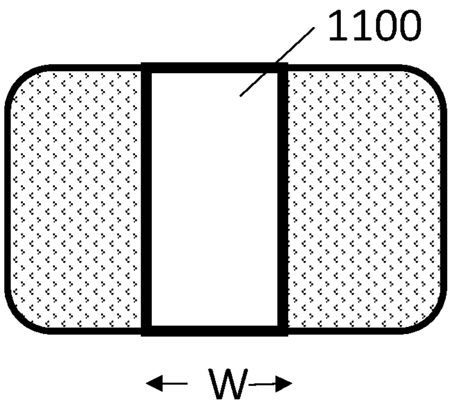
FIG. 8C is a side view of an over-layer unslit sheet material wrapped around an object wrapped in expanded slit sheet material in which the width of the over-layer unslit sheet material is sized to extend across or surround a small or limited portion of a periphery of the object wrapped in expanded slit sheet material.

For illustrative purposes, FIGS. 8B and 8C show illustrative examples of an over-layer unslit sheet material wrapped around objects that are wrapped in expanded slit sheet material. In that regard, FIG. 8B is a side view of an over-layer unslit sheet material 1100 wrapped around an object wrapped in expanded slit sheet material in which the width W of the over-layer unslit sheet material is sized to substantially extend across or surround a substantial portion of a periphery of the object wrapped in expanded slit sheet material, and FIG. 8C is a side view of an over-layer unslit sheet material 1100 wrapped around an object wrapped in expanded slit sheet material in which the width W of the over-layer unslit sheet material is sized to extend across or surround a small or limited portion of a periphery of the object wrapped in expanded slit sheet material.

Figure 9:
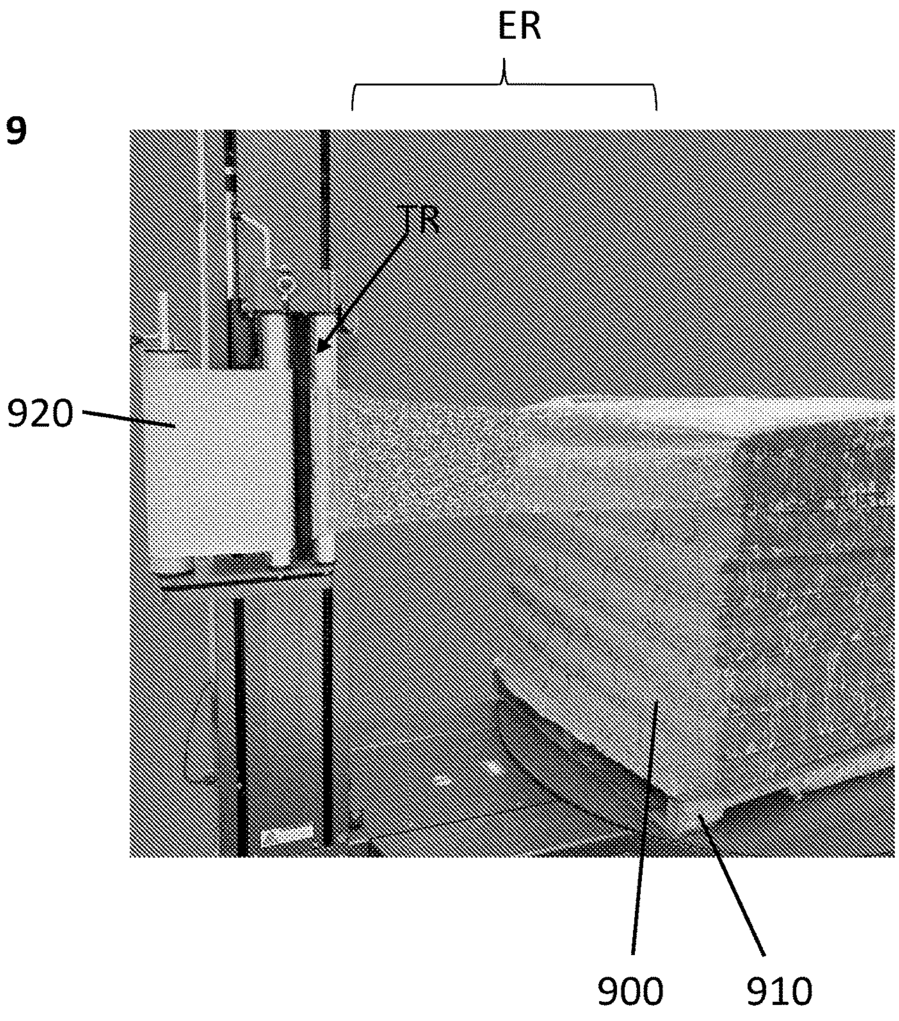
FIG. 9 is a front perspective view of a pallet wrapping system in which an expandable slit sheet paper is expanded and wrapped around a pallet assembly.

With respect to FIG. 9, the figure shows a front perspective view of a pallet wrapping system in which an expandable slit sheet paper is expanded and wrapped around a pallet assembly. According to some embodiments, an over-layer unslit sheet material is employed within the context of the pallet wrapping system shown in FIG. 9 in order to accommodate a label or the like, similarly to the embodiment shown in FIGS. 7 and 8A-8C.

With reference to FIG. 9, in this example, a pallet 910 is provided that includes a frame structure (made of wood or the like) configured to enable the pallet to be lifted and manipulated via pallet-moving machinery, such as, by way of example, a fork lift device. In the preferred embodiments, the pallet is provided to support an stack of boxes or containers thereon and the pallet wrapping system wraps the expanded slit sheet paper around the stack of boxes so as to form a wrapped pallet assembly 900 as shown in FIG. 9. In some preferred embodiments, the boxes or containers contain items of merchandise and/or other items which are stored within the boxes or containers for transportation and/or movement and/or storage of items of merchandise and/or other items. In some embodiments, such pallets can be employed in warehouses, storage facilities, transportation systems, such as, e.g., boats, trains, planes, trucks and/or other vehicles for transportation of items of merchandise and/or other items. In some embodiments, a pallet can support a plurality of like items that are stacked thereon. For example, in some embodiments, like items are stacked on a pallet. In other embodiments, a pallet can support a plurality of varied items, having different shapes and/or dimensions. In the embodiment shown in FIG. 9, the pallet 910 is supported on a rotated table, whereby rotation of the pallet 910 causes the pallet assembly 900 to rotate, thereby causing the expanded paper to wrap around the pallet assembly. The pallet wrapping system is also configured to raise/lower the roll of expandable slit sheet material 920 such as to enable the entire pallet assembly 900 to be wrapped with expanded slit sheet material as shown in FIG. 9.

Although in some embodiments, an over-layer sheet of unslit sheet material can be wrapped around the entire pallet assembly 900, similarly to the embodiment shown in FIGS. 7 and 8A-8C, in the embodiments shown in FIGS. 10-12 and FIGS. 17-19, an over-layer sheet of unslit sheet material is wrapped around (see, e.g., the embodiment of FIGS. 17-19) or connected to (see, e.g., the embodiments in FIGS. 10-12) a region of the expandable slit sheet paper itself so as to be located at a desired position along a side of the pallet assembly 900 without surrounding the entire pallet assembly 900.

Figure 10:
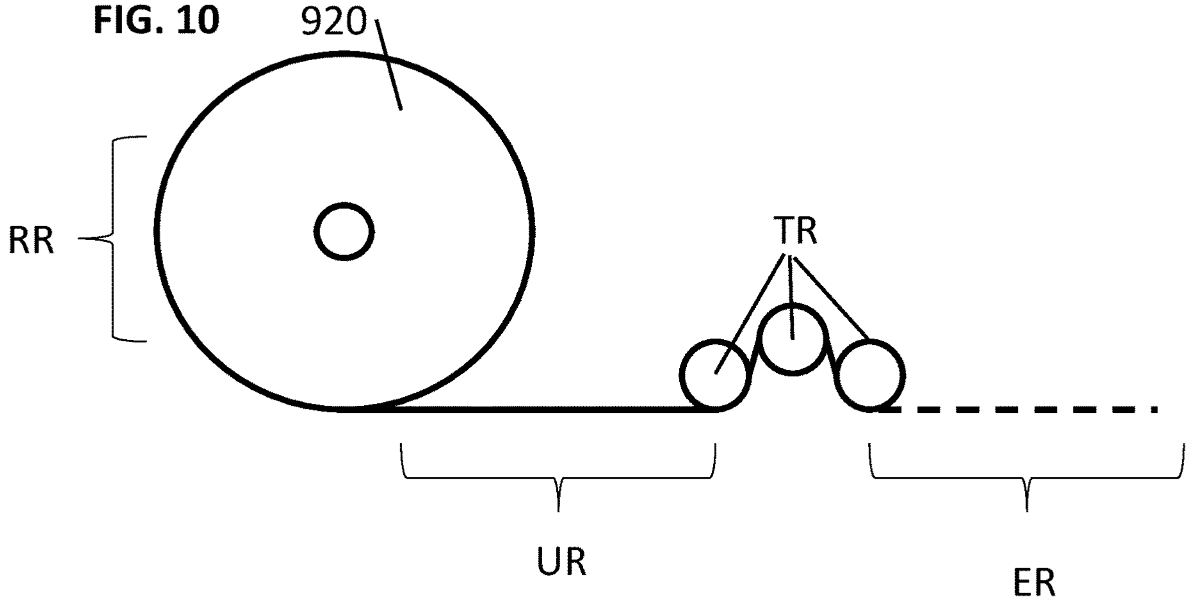
FIG. 10 is a schematic top view of the pallet wrapping system shown in FIG. 9.
Figure 11:
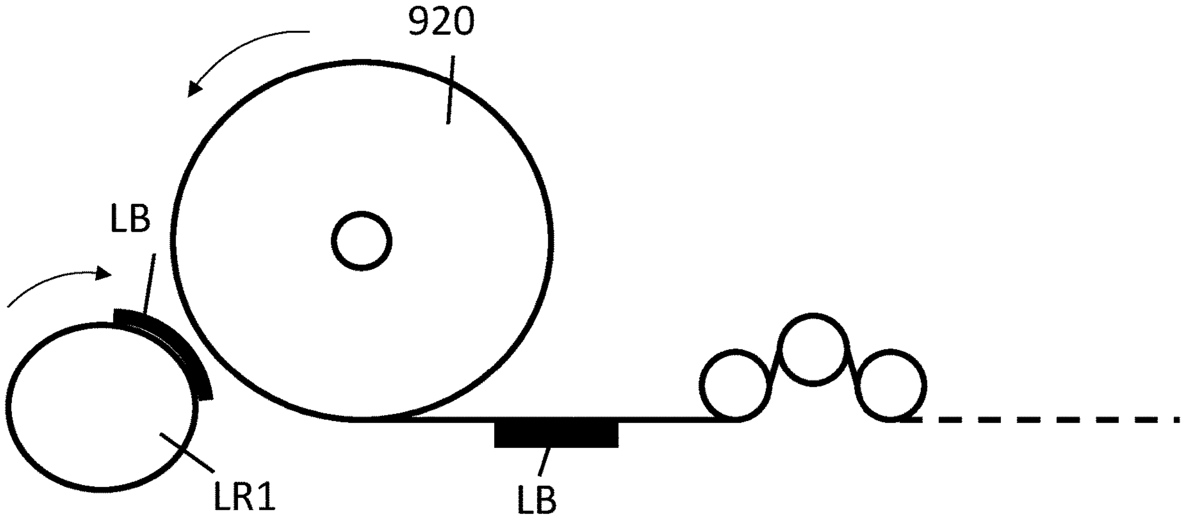
FIG. 11 is a schematic top view of a pallet wrapping system similar to that shown in FIG. 9 further including a label applying member that applies labels to the outer layer of unexpanded slit sheet paper upon the supply roll of expandable slit sheet paper.
Figure 12:
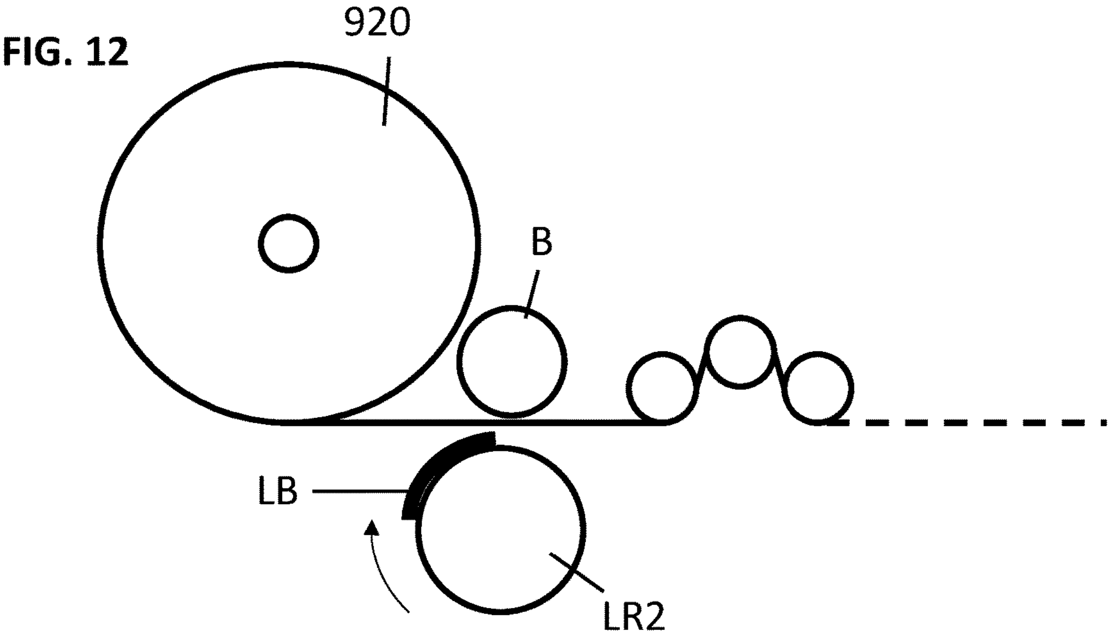
FIG. 12 is a schematic top view of another pallet wrapping system similar to that shown in FIG. 9 further including a label applying member that applies labels to the outer layer of unexpanded slit sheet paper after separating from the supply roll of expandable slit sheet paper, but prior to expansion of the expandable slit sheet paper.

With respect to the embodiment shown in FIGS. 10-12, FIG. 10 is a schematic top view of the pallet wrapping system shown in FIG. 9. As shown in FIG. 10, the roll of slit sheet material 920 has expandable slit sheet material wrapped around the roll in an unexpanded state. For wrapping of the slit sheet material around the pallet assembly 900, the end of the expandable slit sheet material is pulled from the periphery of the roll 920 and extended to tensioning rollers TR. The tensioning rollers provide a tension such that as the pallet assembly 900 is rotated, a tension is applied at the tensioning rollers that causes the expandable slit sheet material to expand as shown in FIG. 9, while the roll 920 feeds the expandable slit sheet material in an unexpanded state towards the tensioning rollers TR. In this manner, the expandable slit sheet material is in an unexpanded state within the roll region RR (i.e., the expandable slit sheet material on the roll 920 is in an unexpanded state) and within the unexpanded region UR (i.e., the expandable slit sheet material is in an unexpanded state prior to the tensioning rollers TR) and is in an expanded state within the region ER after the tensioning rollers TR.

In the embodiments shown in FIGS. 11-12, a label or sheet material is adhered to or otherwise connected to the expandable slit sheet material while the expandable slit sheet material is in an unexpanded state, around the periphery of the roll 920 in the roll region RR (see FIG. 11) or after the expandable slit sheet material separates from the roll but is in an unexpanded state within the unexpanded region UR (see FIG. 12).

With respect to FIG. 11, FIG. 11 is a schematic top view of a pallet wrapping system similar to that shown in FIG. 9 further including a label applying member that applies labels LB to the outer layer of unexpanded slit sheet paper upon the supply roll of expandable slit sheet paper, within the region RR. In this manner, the labels LB are applied to the expandable slit sheet paper while the paper is in an unexpanded state and firmly supported around the roll 920. In the preferred embodiments, the labels LB are adhered to the periphery of the roll 920 (i.e., to the outer unexpanded layer of the expandable slit sheet paper), and is conveyed with the paper as shown in FIG. 11.

In the preferred embodiments, the label LB adheres to the expandable slit sheet paper sufficiently strongly to prevent the region of the expandable slit sheet paper attached to the label LB from expanding even after passing through the tensioning rollers TR. In this manner, the label LB can provide a flat and unexpanded region for labeling. In some embodiments, the label LB can include indicia, such as, e.g., product information, corporate information, delivery or shipping information, logos and/or other indicia and/or can be used to attach other labels or the like.

In some preferred embodiments, the label LB has a width the extends entirely across a width of the expandable slit sheet material (i.e., in a direction transverse to the expansion direction of the expandable slit sheet material). Alternatively, in other embodiments, the label LB can have a width that is narrower than the width of the expandable slit sheet material.

With respect to FIG. 12, FIG. 12 is a schematic top view of another pallet wrapping system similar to that shown in FIG. 9 further including a label applying member that applies labels to the outer layer of unexpanded slit sheet paper after separating from the supply roll of expandable slit sheet paper, but prior to expansion of the expandable slit sheet paper (i.e., within the unexpanded region UR shown in FIG. 10). In this manner, the labels LB are applied to the expandable slit sheet paper while the paper is in an unexpanded state but after separating from the roll 920. In some embodiments, in order to firmly attach the label LB to the expandable slit sheet material within the region UR, a back-up support roller B can be located at an opposite side of the expandable slit sheet material to facilitate firm application of the labels LB within the region UR. In the preferred embodiments, the labels LB are, thus, adhered to the expandable slit sheet paper prior to the tensioning rollers TR, and is conveyed with the paper as shown in FIG. 11. As with the embodiment shown in FIG. 11, in the preferred embodiments, the label LB adheres to the expandable slit sheet paper sufficiently strongly to prevent the region of the expandable slit sheet paper attached to the label LB from expanding even after passing through the tensioning rollers TR. In this manner, the label LB can provide a flat and unexpanded region for labeling. In some embodiments, the label LB can include indicia, such as, e.g., product information, corporate information, delivery or shipping information, logos and/or other indicia and/or can be used to attach other labels or the like.

Although FIGS. 11 and 12 depict rollers LR1 and LR2, respectively, that apply labels LB to the expandable slit sheet paper in an unexpanded state, in some alternative embodiments various other mechanisms can be employed to apply such labels. For example, in some embodiments, labels LB can be applied with a reciprocating member that reciprocates and applies labels LB upon the expandable slit sheet paper, with the labels LB having an adhesive extending along the entire side facing the expandable slit sheet paper such as to adhere thereto upon pressing contact. In some alternative embodiments, an operator can manually place labels LB within the regions RR and/or UR shown in FIG. 10.

Although the embodiments shown in FIGS. 11 and 12 are described in relation to labels that are adhesively connected to the expandable slit sheet material, in some embodiments, the labels can be attached employing other mechanisms, such as, e.g., mechanical connecting elements, such as, e.g., staples, clips or stitching and/other otherwise connected to the expandable slit sheet material. Additionally, although the embodiments shown in FIGS. 11 and 12 are described in relation to preferred embodiments in which the unexpanded slit sheet material adjacent the labels is prevented from expansion due to adhesion of the labels, in some embodiments, the labels can be connected in a manner that does not preclude expansion of the expandable slit sheet material adjacent the labels.

Figure 17:
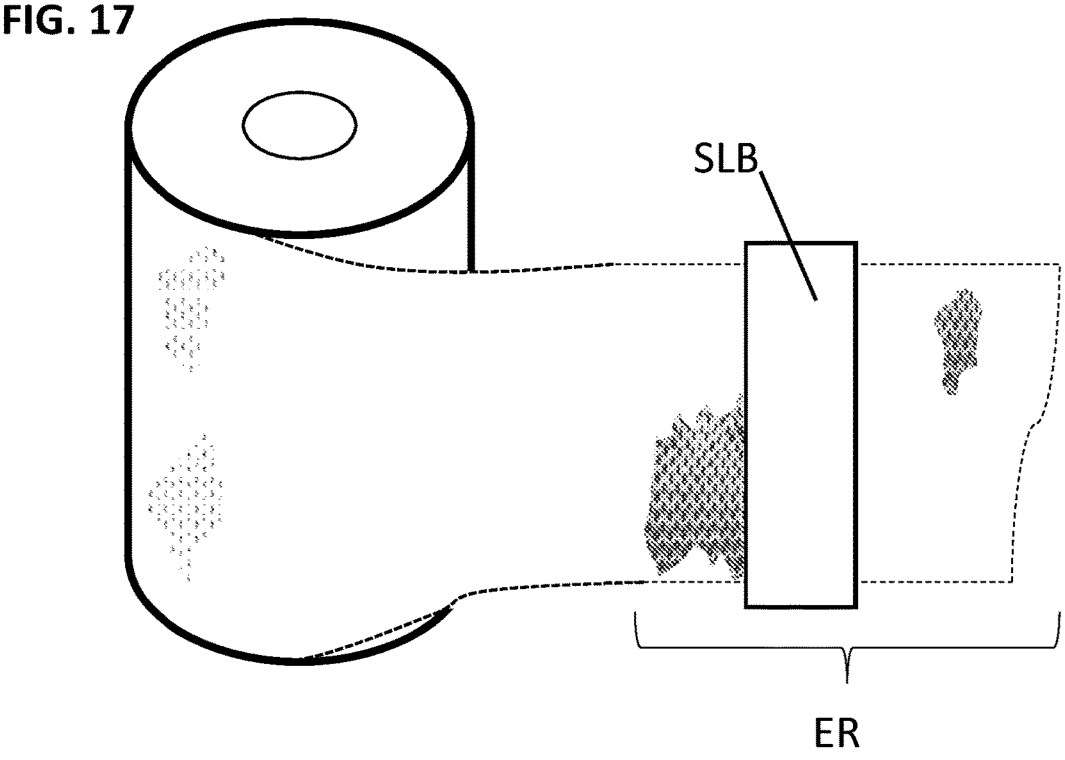
Figure 18:
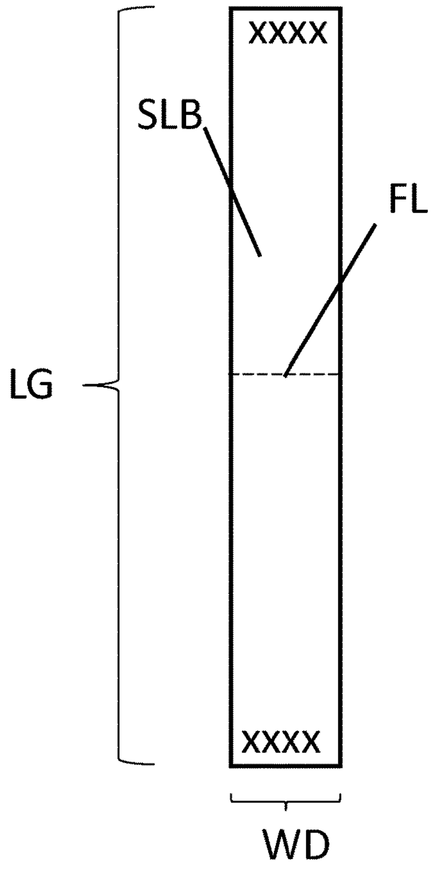
FIG. 18 is a plan view of an illustrative over-layer of unslit sheet material having a narrow width according to some implementations of the embodiment shown in FIG. 17.
Figure 19:
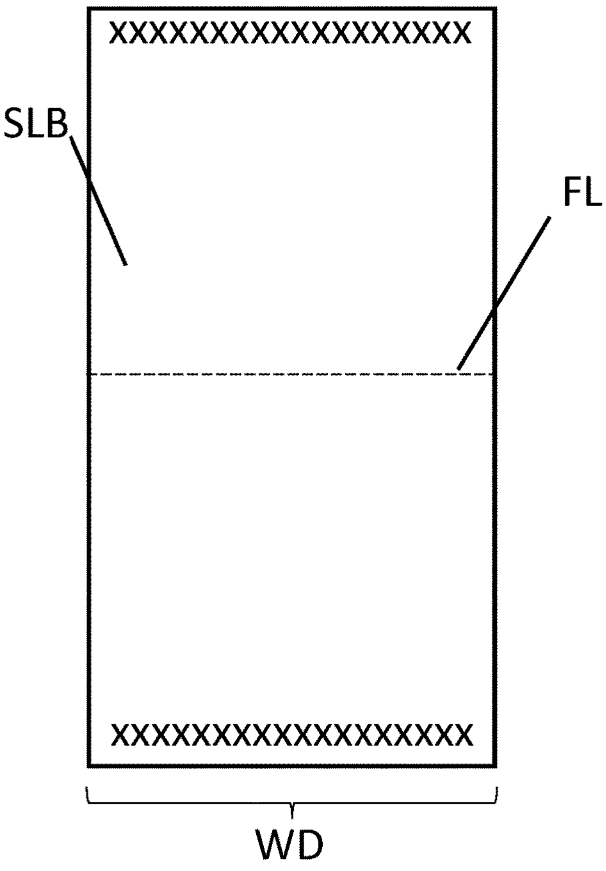
FIG. 19 is a plan view of an illustrative over-layer of unslit sheet material having a wider width according to some other implementations of the embodiment shown in FIG. 17.

With respect to the embodiments shown in FIGS. 17-19, FIGS. 17-19 show another embodiment in which an over-layer of unslit sheet material is wrapped around a region of expandable slit sheet material extending from a roll of slit sheet material, such as, e.g., in the context of a roll of slit sheet material similar to that shown in the pallet wrapping system of FIG. 9 or the like.

In some preferred embodiments, the over-layer of unslit sheet material can be applied around the expandable slit sheet material within an expanded region of the expandable slit sheet material, such as, e.g., within the region ER shown in FIG. 10 and/or FIG. 17. Alternatively, the over-layer of unslit sheet material can be applied around the expandable slit sheet material within an unexpanded region, such as, e.g., within the region UR shown in FIG. 10. However, because the width of the expandable slit sheet paper becomes narrower after expansion in the expanded region ER, in the preferred embodiments, the over-layer is applied around the expandable slit sheet material within the expanded region (e.g., whereby the size of the over-layer can be more closely fitted to the size of the expanded slit sheet material).

In some implementations, the over-layer of unslit sheet material can include a paper or other sheet material SLB that is sized such as to be able to entirely surround the expandable slit sheet material as shown in FIG. 17. Towards that end, in some embodiments, the over-lay of unslit sheet material SLB preferably has a length LG (see FIG. 18) that is more than twice the width of the expandable slit sheet material at the location where the over-lay of unslit sheet material SLB is applied to the expandable slit sheet material. In that regard, in some embodiments, the over-lay of unslit sheet material SLB is folded at the fold line FL and applied around the expandable slit sheet material such that the expandable slit sheet material passes in between the two halves of the over-lay. Then, the over-lay of unslit sheet material SLB is preferably adhered or connected to itself (such as, e.g., in a similar manner to the over-lay 1100 discussed above in relation to the embodiments of FIGS. 7 and 8. In some embodiments, the over-lay can be connected by adhesives, but in other embodiments, various other connecting mechanisms can be employed, such as, e.g., mechanical connecting mechanisms, such as, e.g., staples, clips, stitching or the like. Alternatively, in some embodiments, the over-lay of unslit sheet material SLB can be simply draped over the expandable slit sheet material and/or can be otherwise attached or connected to the expandable slit sheet material, such as, e.g., by being adhesively attached to the expandable slit sheet material, connected by mechanical mechanisms, such as, e.g., staples, clips or stitching or the like.

In various embodiments, the width WD of the over-lay of unslit sheet material SLB can be selected as desired. For example, as shown in FIG. 18, in some embodiments, the width WD can be narrower, such as, e.g., between about 1-5 inches, or, in some embodiments, between about 2-4 inches. As another example, as shown in FIG. 19, in some embodiments, the width WD can be wider, such as, e.g., between about 4 to 16 inches, or, in some embodiments, between about 6 to 12 inches.

In some preferred implementations of the embodiments shown in FIGS. 10-12 and 17-19, the over-layers of unslit sheet material can be selectively applied to the expandable slit sheet material at a desired timing and positioning. In this manner, for example, an operator of a pallet wrapping system, such as, e.g., shown in FIG. 9 can wrap the pallet assembly 900 and then apply one or more over-layer at a desired position alongside the pallet assembly 900 for appropriate labeling for shipping labeling and/or other desired purposes.

In some embodiments, the over-layers SLB shown in FIGS. 17-19 can be applied via an automated mechanism. In some alternative embodiments, an operator can apply the over-layers SLB shown in FIGS. 17-19 simply by hand.

In some alternative embodiments, an over-layer SLB can be wrapped around a region of the expanded slit sheet paper after it has already been wrapped around the pallet assembly 900 or the like. For example, in some illustrative embodiments, an operator can manually pull a region of the expanded slit sheet paper and insert an over-layer sheet so as to surround the expanded slit sheet paper (e.g., similarly, to that shown in FIG. 17) and then release the expanded slit sheet paper such that the over-layer sheet is supported alongside the pallet assembly 900 at a desired location. In some illustrative embodiments, the over-layer sheet can be a double long sheet (for example, 8½ inches×22 inches, such that it can be folded over and present an 8½"×22" sheet alongside the pallet. Towards that end, in some illustrative embodiments, the width of the expanded slit sheet wrap around the pallet assembly can be between about 10" to 15" in some illustrative embodiments. In the event that the width of the expanded slit sheet wrap is slightly larger than the width of the folded over-layer sheet SLB, the expandable slit sheet paper can be readily compressed slightly to fit within the folded over-layer sheet. Alternatively, the overlayer sheet can be sized to accommodate the width of the expanded slit sheet paper without compressing to surround the expanded slit sheet paper with the over-layer sheet. As discussed above, once the over-layer sheet is formed so as to surround one or more layer of the expanded slit sheet paper, the over-layer sheet can simply be stapled or otherwise connected at its ends so as to surround or encircle the expanded slit sheet paper, such as, e.g., by adhesives, staples, clips, stitching or the like. Additionally, in some embodiments, the over-layer sheet can simply be draped over the expandable slit sheet paper or can be adhered to the expandable slit sheet paper directly, such as, e.g., adhesives, staples, clips, stitching or the like.

Although the embodiments shown in FIGS. 11-12 show examples in which adhesive labels or the like are attached to the unexpanded slit sheet paper prior to expansion after the roll of slit sheet paper has already been formed, in some alternative embodiments adhesive labels or the like can be attached to the unexpanded slit sheet paper prior to forming the roll of slit sheet paper. For example, in some embodiments, prior to rolling the unexpanded slit sheet paper (e.g., prior to wrapping the expandable slit sheet paper around a paper core or the like) one or more, preferably, a plurality of adhesive labels or the like can be attached to the length of unexpanded slit sheet paper at desired intervals. In this manner, in some embodiments, adhesive labels can be pre-attached to the roll of expandable slit sheet paper, such that the adhesive labels are rolled together with the expandable slit sheet paper. In such embodiments, during the process of expanding the expandable slit sheet paper, the adhesive labels or the like do not need to, thus, be added to the expandable slit sheet material, but can simply be conveyed with the expandable slit sheet paper as it is pulled from the perimeter of the roll of expandable slit sheet material.

Although FIGS. 9-12 and 17-19 depict illustrative embodiments in which a roll of expandable slit sheet material is employed to wrap pallets or the like, in other embodiments rolls of expandable slit sheet paper can be employed to simply wrap objects or items, such as merchandise, products and the like, such as, e.g., being expanded via a manual or automated expansion device for manual wrapping of such objects or items by an operator.

Figure 13:
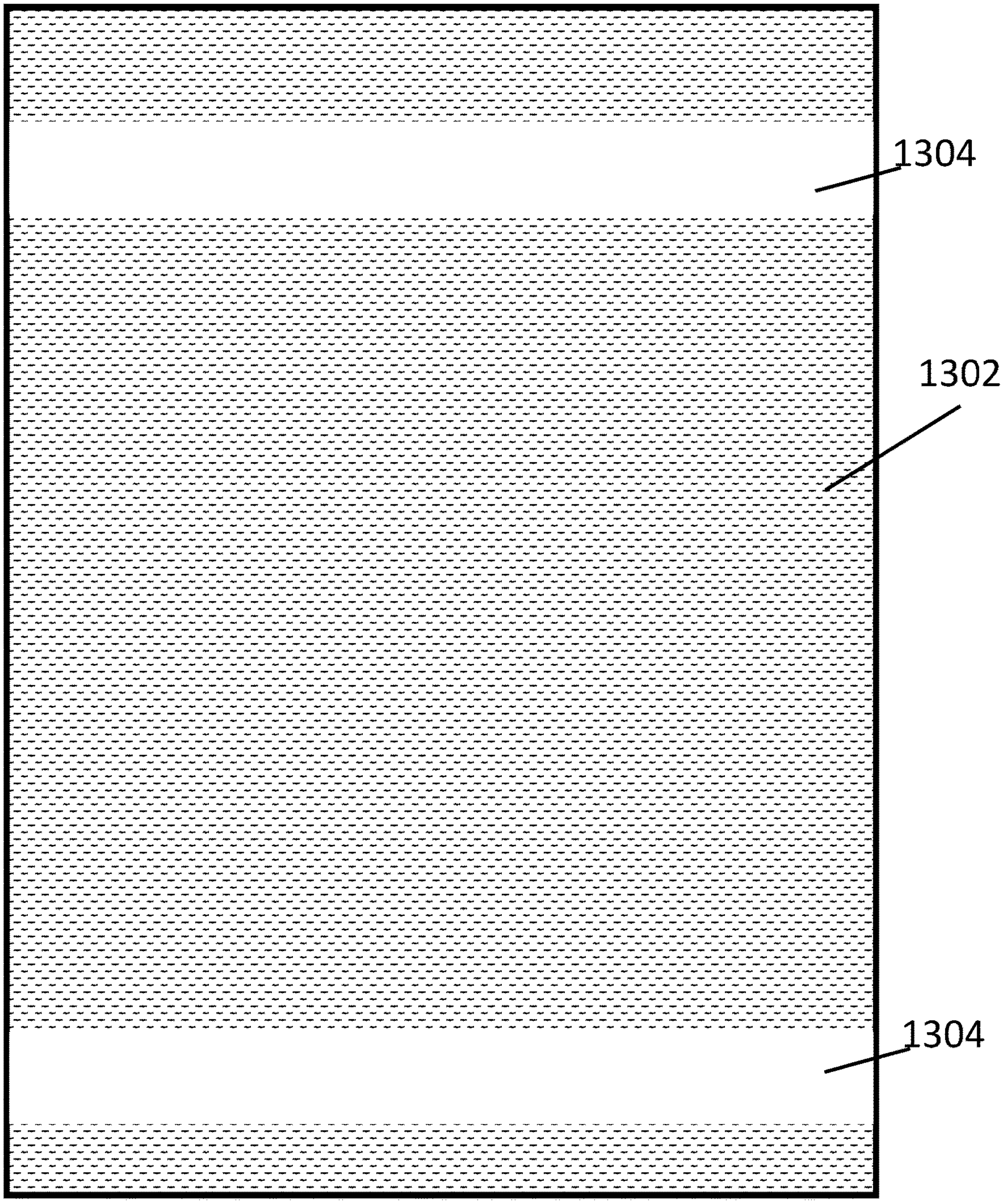
FIG. 13 is a plan view of a length of expandable slit sheet paper in an unexpanded state, including regions with an array of slits, and transverse regions across the entire width of the slit sheet paper that are unslit.

With reference to FIG. 13, FIG. 13 shows another illustrative embodiment of an expandable slit sheet material having regions 1302 with arrays of expandable slits and unslit regions 1304. In the illustrated example of FIG. 13, the unslit regions 1304 extend entirely across the width of the sheet (i.e., in a direction transverse to the expansion direction of the expandable slit sheet material). As described in relation to various embodiments herein, the width of the unslit regions 1304 (i.e., in a direction parallel to the expansion direction of the expandable slit sheet material) can be selected as desired and can range from, e.g., about an inch or less to a foot or more in some embodiments. Additionally, as described in relation to various embodiments herein, the distance between unslit regions 1304 can be selected as desired and can range from, e.g., about a few inches to a few feet or more, or even up to 10 feet or more. For example, in the context of a pallet wrapping system similar to that shown in FIG. 9, in some embodiments, unslit regions 1304 can be separated by a few feet or more or even up to 10 feet or more.

In some embodiments, the expandable slit sheet material shown in FIG. 13 can be created by employing a rotary die that includes an array of cutting blades around the periphery of the rotary cutting die, whereby as the die rotates, the cutting blades cut the array of slits within the sheet material to create the expandable slit sheet material. In some preferred embodiments, the die includes locations without cutting blades such that as the rotary cutting die rotates, when the locations without cutting blades is adjacent the sheet material, an unslit region (e.g., 1304 or the like) is created. In this manner, the system can continuously create an expandable slit sheet material with consistently spaced unslit regions. In some other embodiments, a rotary cutting die can include cutting blades around an entire periphery of the rotary cutting die and the rotary cutting die can be separated from the sheet material periodically to create periodic unslit regions as described in various embodiments herein.

Figure 14:
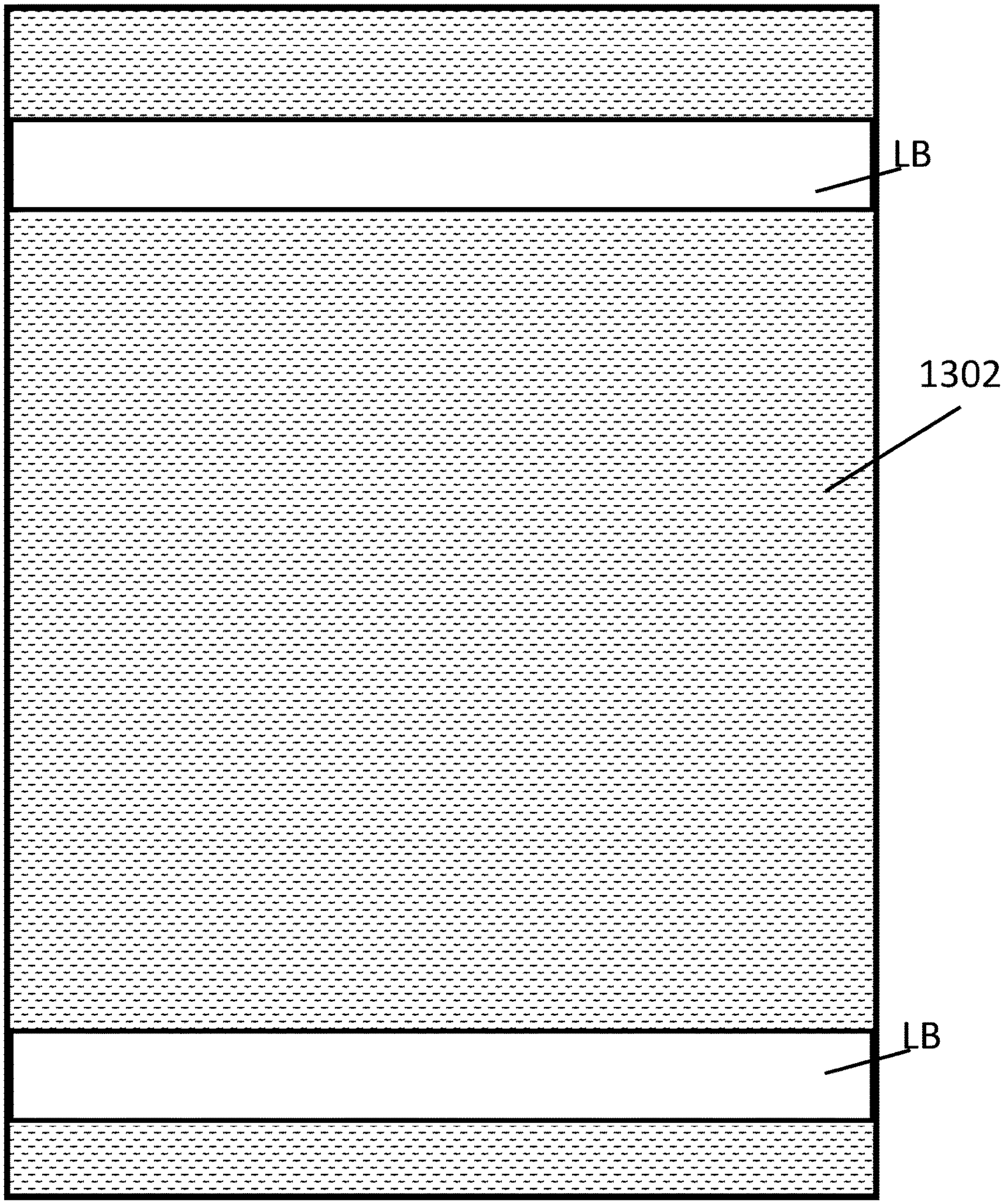
FIG. 14 is a plan view of a length of expandable slit sheet paper in an unexpanded state, including regions with an array of slits, and transverse regions across the entire width of the slit sheet paper that include labels.

With respect to FIG. 14, FIG. 14 is a plan view of a length of expandable slit sheet paper in an unexpanded state, including regions with an array of slits 1302, and transverse regions across the entire width of the slit sheet paper that include labels LB. In some preferred embodiments, expandable slit sheet paper has such an array of slits 1302 along its entire surface and the labels LB are applied upon the expandable slit sheet paper while the expandable slit sheet paper is in an unexpanded state, such as, e.g., in a manner similar to that described above in relation to the embodiments shown in FIGS. 10 and 11.

Figure 15A:
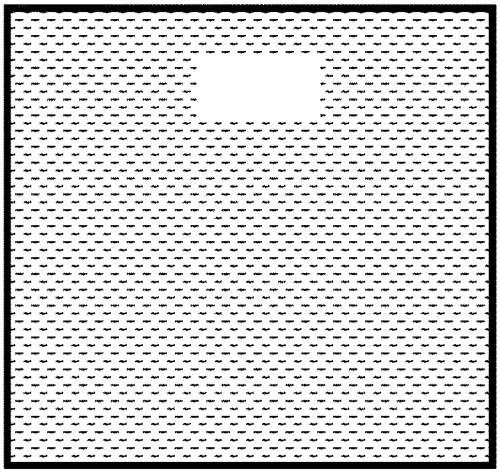
FIG. 15A is a plan view of a length of expandable slit sheet paper in an unexpanded state, including regions with an array of slits, and at least one region partially extending across the width of the slit sheet paper that are unslit.

With respect to FIG. 15A, FIG. 15A is a plan view of a length of expandable slit sheet paper in an unexpanded state, including regions with an array of slits, and at least one region partially extending across the width of the slit sheet paper that are unslit. The embodiment in FIG. 15A is similar to that shown in FIG. 13, except that the unslit regions do not extend entirely across the width of the expandable slit sheet material (i.e., in a direction transverse to the direction of expansion).

Figure 15B:
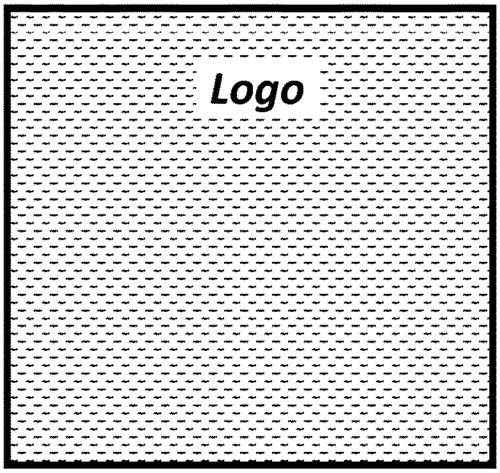
FIG. 15B is a plan view of the length of expandable slit sheet paper in an unexpanded state shown in FIG. 15A, with indicia or labeling applied within the unslit region.

With respect to FIG. 15B, FIG. 15B is a plan view of the length of expandable slit sheet paper in an unexpanded state shown in FIG. 15A, with indicia or labeling applied within the unslit region. In some illustrative embodiments, the indicia or labeling applied can consistent of a separately applied label, such as, e.g., a label that is adhesively applied or the like, while in some embodiments, the indicia or labeling can be printed or otherwise applied within the unslit region.

Figure 15C:
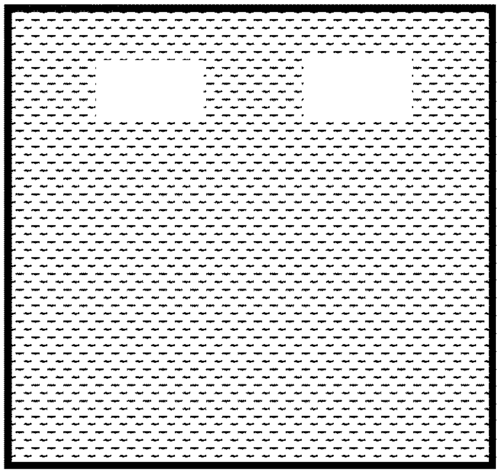
FIG. 15C is a plan view of a length of expandable slit sheet paper in an unexpanded state, including regions with an array of slits, and at least two regions partially extending across the width of the slit sheet paper that are unslit.

With respect to FIG. 15C, FIG. 15C is a plan view of a length of expandable slit sheet paper in an unexpanded state similar to that shown in FIG. 15A, including regions with an array of slits, and at least two regions partially extending across the width of the slit sheet paper that are unslit.

Figure 15D:
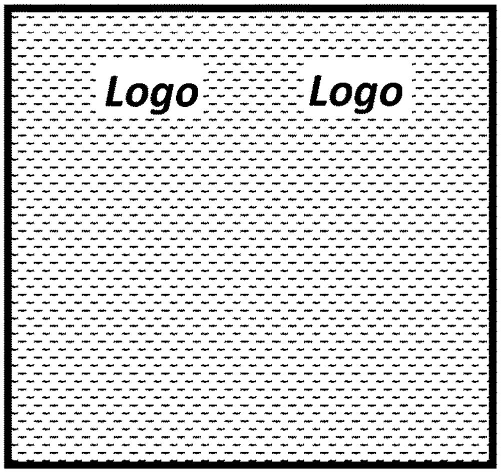
FIG. 15D is a plan view of the length of expandable slit sheet paper in an unexpanded state shown in FIG. 15C, with indicia or labeling applied within the at least two unslit regions.

With respect to FIG. 15D, FIG. 15D is a plan view of the length of expandable slit sheet paper in an unexpanded state shown in FIG. 15C, with indicia or labeling applied within the at least two unslit regions in a similar manner to that shown in FIG. 15B.

Figure 16A:
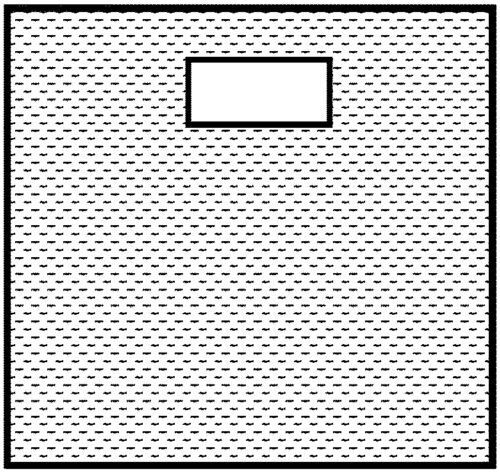
FIG. 16A is a plan view of a length of expandable slit sheet paper in an unexpanded state, including regions with an array of slits, and at least one region partially extending across the width of the slit sheet paper that includes a label.

With respect to FIG. 16A, FIG. 16A is a plan view of a length of expandable slit sheet paper in an unexpanded state, including regions with an array of slits, and at least one region partially extending across the width of the slit sheet paper that includes a label. The embodiment in FIG. 16A is similar to that shown in FIG. 14, except that the unslit regions do not extend entirely across the width of the expandable slit sheet material (i.e., in a direction transverse to the direction of expansion).

Figure 16C:
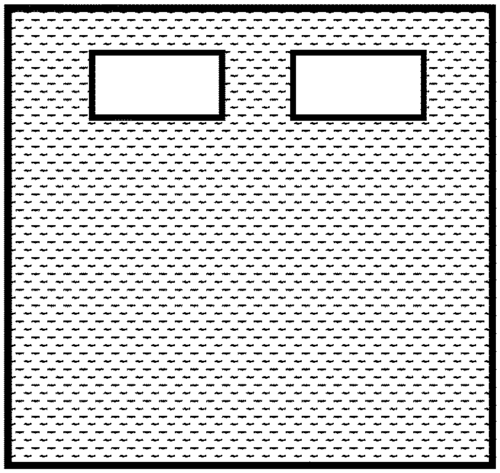
FIG. 16C is a plan view of a length of expandable slit sheet paper in an unexpanded state, including regions with an array of slits, and at least two regions partially extending across the width of the slit sheet paper that include labels.
Figure 16B:
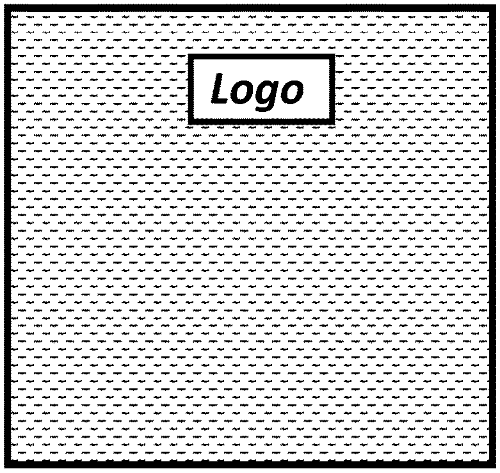
FIG. 16B is a plan view of the length of expandable slit sheet paper in an unexpanded state shown in FIG. 15A6 with indicia or labeling applied upon the label.

With respect to FIG. 16B, FIG. 16B is a plan view of the length of expandable slit sheet paper in an unexpanded state shown in FIG. 16A with indicia or labeling applied upon the label.

With respect to FIG. 16C, FIG. 16C is a plan view of a length of expandable slit sheet paper in an unexpanded state similar to that shown in FIG. 16A, including regions with an array of slits, and at least two regions partially extending across the width of the slit sheet paper that include labels.

Figure 16D:
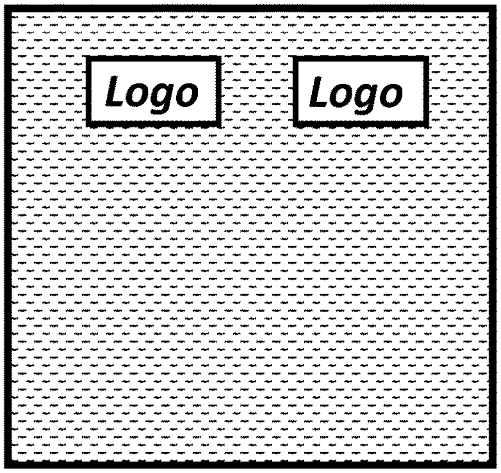
FIG. 16D is a plan view of the length of expandable slit sheet paper in an unexpanded state shown in FIG. 16C, with indicia or labeling applied upon the labels.

With respect to FIG. 16D, FIG. 16D is a plan view of the length of expandable slit sheet paper in an unexpanded state shown in FIG. 16C, with indicia or labeling applied upon the labels.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A structure for applying labeling to an item or object wrapped in an expandable slit sheet paper for cushioning, comprising:

- at least one layer of expandable slit sheet paper wrapped around an item or object for cushioning;
- an over-layer sheet wrapped around the expandable slit paper;
- indicia or labeling applied to the over-layer sheet;
- wherein said over-layer sheet is wrapped around a section of said expandable slit sheet paper without surrounding an item or object that is cushioned by said expandable slit sheet paper.

2. The structure of claim 1, wherein said over-layer sheet is wrapped around the expandable slit paper, and said expandable slit paper is wrapped around an item or object for cushioning of the item or object.

3. The structure of claim 1, wherein said expandable slit sheet paper is wrapped around a pallet assembly.

4. The structure of claim 1, wherein opposite ends of the over-layer sheet are connected together.

5. The structure of claim 4, further including an adhesive applied to at least one end region of the over-layer sheet such that the over-layer sheet bonds to itself.

6. The structure of claim 1, wherein said over-layer sheet has a width in an expansion direction of the expandable slit sheet paper of between about 1 to 12 inches.

7. The structure of claim 1, wherein said over-layer sheet has a width in an expansion direction of the expandable slit sheet paper of between about 4 to 9 inches.

8. The structure of claim 1, wherein said over-layer sheet has a width in an expansion direction of the expandable slit sheet paper of between about 8 to 9 inches.

9. The structure of claim 1, wherein the slit sheet paper is a Kraft paper in the range from about 30 # to 70 #.

10. The structure of claim 1, wherein said over-layer sheet is wrapped around at least one or more layers of said at least one layer of expandable slit sheet paper with said over layer sheet extending beneath a lower surface of said one or more layers of said at least one layer of expandable slit sheet paper and above an upper surface of said one or more layers of said at least one layer of expandable slit sheet paper.

11. The structure of claim 10, wherein said expandable slit sheet paper is wrapped entirely around said item or object around which said expandable slit sheet paper is wrapped, and said over-layer sheet is located on one side of said item or object around which the expandable slit sheet paper is wrapped.

* * * * *